(12) United States Patent
Viswanathan et al.

(10) Patent No.: US 12,386,999 B2
(45) Date of Patent: Aug. 12, 2025

(54) SYSTEMS AND METHODS FOR DATA SECURITY ASSOCIATED WITH EXECUTION OF TASKS

(71) Applicant: Yohana LLC, Palo Alto, CA (US)

(72) Inventors: Nitin Viswanathan, San Francisco, CA (US); Mabel Iwahashi, Mountain View, CA (US); Kaitlin Seligson, San Diego, CA (US); William Mintun, Aptos, CA (US); Yoky Matsuoka, Los Altos Hills, CA (US); Lingyun Liu, Sunnyvale, CA (US); Sean Paterson, Mountain View, CA (US); Matthew Chaulker, Dublin, CA (US)

(73) Assignee: Yohana LLC, Palo Alto, CA (US)

( * ) Notice: Subject to any disclaimer, the term of this patent is extended or adjusted under 35 U.S.C. 154(b) by 260 days.

(21) Appl. No.: 18/330,761

(22) Filed: Jun. 7, 2023

(65) Prior Publication Data

US 2023/0394173 A1    Dec. 7, 2023

Related U.S. Application Data

(60) Provisional application No. 63/349,695, filed on Jun. 7, 2022.

(51) Int. Cl.
*G06F 21/62*     (2013.01)
*G06F 21/60*     (2013.01)

(52) U.S. Cl.
CPC ........ *G06F 21/6245* (2013.01); *G06F 21/604* (2013.01); *G06F 21/6227* (2013.01)

(58) Field of Classification Search
CPC . G06F 21/6245; G06F 21/604; G06F 21/6227
See application file for complete search history.

(56) References Cited

U.S. PATENT DOCUMENTS

| 8,255,258 B1 | 8/2012 | Cohen et al. |
| 2013/0239126 A1* | 9/2013 | Sun ........................ G06Q 10/06 719/318 |

(Continued)

OTHER PUBLICATIONS

International Search Report and Written Opinion mailed Oct. 17, 2023 in International Application PCT/US2023/068042.

*Primary Examiner* — Izunna Okeke
(74) *Attorney, Agent, or Firm* — Polsinelli LLP

(57) ABSTRACT

Systems and methods for automatic securitization of sensitive information accessible under limited circumstances for the execution of tasks are provided. The systems and methods may receive a request to perform a task that corresponds to operations performable to complete the task. These operations include a sensitive operation that require use of sensitive information associated with a member. A link is generated in real-time as other operations are being performed. Through the link, the member can store their sensitive information in a data privacy vault without exposing the sensitive information to unauthorized entities. The task is transferred to a high-trust representative when the other operations are performed to allow the high-trust representative to access the data privacy vault to obtain the sensitive information. The high-trust representative uses the sensitive information to perform the sensitive operation without exposing the sensitive information to the member or any other unauthorized entity.

21 Claims, 15 Drawing Sheets

(56) References Cited

U.S. PATENT DOCUMENTS

2022/0012364 A1   1/2022  LaFever et al.
2024/0078337 A1*  3/2024  Kamyshenko ...... G06F 21/6245

* cited by examiner

SYSTEMS AND METHODS FOR DATA SECURITY ASSOCIATED WITH EXECUTION OF TASKS

CROSS-REFERENCE TO RELATED APPLICATIONS

The present patent application claims the priority benefit of U.S. Provisional Patent Application 63/349,695 filed Jun. 7, 2022, the disclosures of which are incorporated herein by reference.

FIELD

The present disclosure relates to the automatic securitization of sensitive information that is made accessible under limited circumstances for the execution of particular tasks. In one example, the systems and methods described herein may be used to secure sensitive information associated with a member and that can be used on a need-to-know basis by authorized representatives for the execution of particular tasks on behalf of the member.

SUMMARY

Disclosed embodiments may provide a framework for the automatic securitization of sensitive information that can be made accessible only under limited circumstances for the execution of particular tasks. According to some embodiments, a computer-implemented method is provided. The computer-implemented method comprises receiving a request to perform a task on behalf of a member. The task corresponds to a set of operations performable for completion of the task. Further, the set of operations include a sensitive operation. The task is assigned to a representative associated with the member for performance of tasks on behalf of the member. The computer-implemented method further comprises determining that the sensitive operation is performable using sensitive information associated with the member. The computer-implemented method further comprises generating a link associated with a data privacy vault. The link is generated in real-time as other operations in the set of operations associated with the task are being performed. Further, the data privacy vault is inaccessible to the representative. When the link is received by the member, the member stores the sensitive information in the data privacy vault. The computer-implemented method further comprises transferring the task when the other operations are performed. When the task is received by a high-trust representative, the high-trust representative accesses the data privacy vault to obtain the sensitive information for performance of the sensitive operation. Further, the sensitive information is not made available to the representative. The computer-implemented method further comprises communicating completion of the task. The completion of the task is communicated without the sensitive information.

In some embodiments, the computer-implemented method further comprises obtaining an access log corresponding to historical access to the sensitive information through the data privacy vault. The computer-implemented method further comprises identifying any access violations associated with the historical access to the sensitive information. The access violations are identified based on the access log. The computer-implemented method further comprises performing one or more remedial actions based on the access violations.

In some embodiments, when the sensitive information is stored in the data privacy vault, the sensitive information is unavailable to the member through the data privacy vault.

In some embodiments, access to the sensitive information within the data privacy vault is subject to a timeout period. Further, when the timeout period expires, the high-trust representative is automatically prevented from accessing the sensitive information.

In some embodiments, the computer-implemented method further comprises automatically providing a status corresponding to performance of the sensitive operation. The status is provided without the sensitive information.

In some embodiments, the task is transferred with an identifier corresponding to the sensitive information. The identifier does not include any portion of the sensitive information. Further, the identifier is usable to query the data privacy vault to obtain the sensitive information.

In some embodiments, access to the sensitive information is automatically terminated upon the completion of the task.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to identify and recommend experiences to a member of a task facilitation service in order to reduce the member's cognitive load and allow the member to partake in enjoyable activities. Through this framework, the task facilitation service can generate a set of experiences in each market that the task facilitation service operates in to allow for personalization of experiences for members within the market. Further, experiences can be recommended to a member such that, if the member selects an experience, a representative assigned to the member can curate the experience on behalf of the member, thereby reducing the member's cognitive load.

Figure 1:
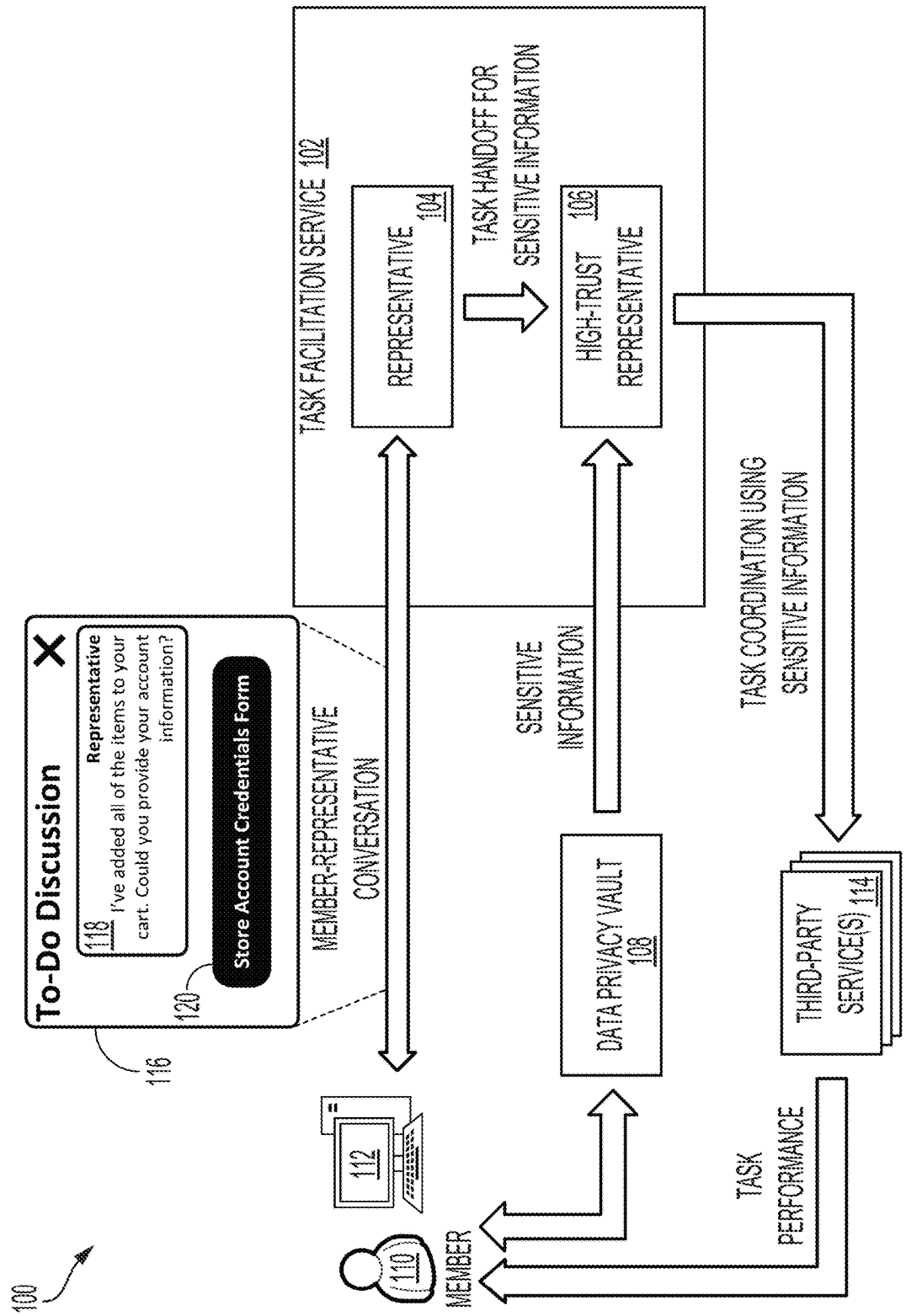
FIG. 1 shows an illustrative example of an environment in which sensitive information associated with a member is stored in a data privacy vault and made accessible to a high-trust representative for performance of a particular task in accordance with at least one embodiment.

FIG. 1 shows an illustrative example of an environment 100 in which sensitive information associated with a member 110 is stored in a data privacy vault 108 and made accessible to a high-trust representative 106 for performance of a particular task in accordance with at least one embodiment. In the environment 100, a member 110 of the task facilitation service 102 may be engaged in a communications session 116 with an assigned representative 104. The member 110, through the communications session 116, may transmit one or more messages to the representative 104 to indicate that the member 110 requires assistance in completing a project and/or task for the benefit of the member 110. For example, the member 110 may indicate that they require the representative's assistance in purchasing one or more items that are to be delivered to the member 110. The representative 104, in response to these messages, may begin performance of this task and/or project. For example, as illustrated in FIG. 1, the representative 104, through a message 118 exchanged over the communications session 116, may indicate that they have added all of the requested items associated with the member's request for assistance to a virtual cart.

The task facilitation service 102 may be implemented to reduce the cognitive load on members and their families in performing various projects and tasks in and around their homes by identifying and delegating projects and tasks to representatives that may coordinate performance of these tasks for the benefit of these members. A member, such as member 110, may be paired with a representative 104 during an onboarding process, through which the task facilitation service 102 may collect identifying information of the member 110. For instance, the task facilitation service 102 may provide, to the member 110, a survey or questionnaire through which the member 110 may provide identifying information usable to select a representative 104 for the member 110. The task facilitation service 102 may prompt the member 110 to provide detailed information with regard to the composition of the member's family (e.g., number of inhabitants in the member's home, the number of children in the member's home, the number and types of pets in the member's home, etc.), the physical location of the member's home, any special needs or requirements of the member 110 (e.g., physical or emotional disabilities, etc.), and the like. In some instances, the member 110 may be prompted to provide demographic information (e.g., age, ethnicity, race, languages written/spoken, etc.). The member 110 may also be prompted to indicate any information related to one or more projects and/or tasks that the member 110 wishes to possibly delegate to a representative 104. This information may specify the nature of these projects and/or tasks (e.g., gutter cleaning, installation of carbon monoxide detectors, party planning, etc.), a level of urgency for completion of these projects and/or tasks (e.g., timing requirements, deadlines, date corresponding to upcoming events, etc.), any member preferences for completion of these projects and/or tasks, and the like.

The collected identifying information may be used by the task facilitation service 102 to identify and assign a representative 104 to the member 110. For instance, the task facilitation service 102 may use the identifying information of a member 110, as well as any information related to the member's level of comfort or interest in delegating tasks to others, and any other information obtained during the onboarding process as input to a classification or clustering algorithm configured to identify representatives that may be well-suited to interact and communicate with the member 110 in a productive manner. Using the classification or clustering algorithm, the task facilitation service 102 may identify a representative 104 that may be more likely to develop a positive, long-term relationship with the member 110 while addressing any tasks that may need to be addressed for the benefit of the member 110.

The representative 104 may be an individual that is assigned to the member 110 according to degrees or vectors of similarity between the member's and representative's demographic information. For instance, if the member 110 and the representative 104 share a similar background (e.g., attended university in the same city, are from the same hometown, share particular interests, etc.), the task facilitation service 102 may be more likely to assign the representative 104 to the member 110. Similarly, if the member 110 and the representative 104 are within geographic proximity to one another, the task facilitation service 102 may be more likely to assign the representative 104 to the member 110.

When a representative 104 is assigned to the member 110 by the task facilitation service 102, the task facilitation service 102 may notify the member 110 and the representative 104 of the pairing. Further, the task facilitation service 102 may establish a communications session between the member 110 and the assigned representative 104 to facilitate communications between the member 110 and the representative 104. For instance, via an application provided by the task facilitation service 102 and installed on the computing device 112, the member 110 may exchange messages with the assigned representative 104 for a particular task over the communications session 116. Similarly, the representative 104 may be provided with an interface, such as a representative console (described in greater detail herein), through which the representative 104 may exchange messages with the member 110 over the communications session 116.

In an embodiment, a representative 104 can generate a new project or task that may be performed for the benefit of the member 110. For instance, the representative 104 may submit a request to the task facilitation service 102 to generate a new project or task. In response to the request from the representative 104 to generate a new project or task that is to be performed for the benefit of the member 110, the task facilitation service 102 may identify one or more templates that may be used by the representative 104 to define the new project or task. The one or more task templates may correspond to the task type or category for the projects and/or tasks being defined. For example, if the member 110 has specified, via a communications session facilitated between the member 110 and the representative 104, that the member 110 requires assistance with purchasing a set of items from a particular online retailer for delivery to the member's home, the representative 104 may select a template corresponding to online purchases.

For the new project or task, the representative 104 may define one or more operations that may be performed in order to complete the project or task. For example, if the member 110 submits a request, through a communications session between the member 110 and the representative 104, to assist the member 110 with their weekly meal planning, the representative 104 may define a new task related to the creation of the member's weekly meal plan and to define one or more operations for completing the member's weekly meal plan. These one or more operations may include developing a list of recipes corresponding to meals to be included in the plan, creation of a shopping list for purchasing ingredients associated with these meals, purchasing the items on the shopping list on behalf of the member 110, and the like. Communications related to each of these operations may be exchanged over the communications session 116, whereby the member 110 and the representative 104 may exchange messages related to the particular task.

In an embodiment, the representative 104 evaluates the one or more operations associated with the particular task or project to determine whether sensitive information associated with the member 110 is required for completion of the task. Returning to the previous illustrative example related to the member's weekly meal planning, the representative 104 may determine that, in order for the items on the shopping list to be purchased from an online retailer, the member 110 may be required to provide their account credentials associated with the online retailer. In some instances, the representative 104 may determine that the member 110 may be required to provide payment information, such as a payment card number, a card verification value (CVV) associated with the payment card, the expiration date associated with the payment card, and the like. As another illustrative example, if the representative 104 has defined a task related to the scheduling of a medical procedure, the representative 104 may determine that, in order for the medical procedure to be scheduled, the member 110 may be required to provide their medical insurance information. Such information may be deemed to be sensitive in nature, whereby inadvertent or purposeful dissemination and exposure of such information to unauthorized entities may produce harm to the member 110. Accordingly, the task facilitation service 102 may prohibit the representative 104 from accessing such sensitive information.

In an embodiment, the task facilitation service 102 implements a machine learning algorithm or artificial intelligence that is dynamically trained to automatically determine whether any sensitive information associated with a member 110 is required for completion of a task. For instance, the task facilitation service 102 may implement a machine learning algorithm, such as a natural language processing (NLP) algorithm, or other artificial intelligence to process the messages exchanged between the member 110 and the representative 104 as these messages are exchanged in real-time over the communications session 116 to determine whether any sensitive information associated with the member 110 may be needed for completion of a task. For instance, the task facilitation service 102 may process any incoming messages from the member 110 and the representative 104 over the communications session 116 to detect an operation associated with a task or project that may require sensitive information associated with the member 110. As an illustrative example, if the representative 104 expresses, over the communications session 116, that they have completed adding the requested items to a virtual cart associated with an online retailer, the machine learning algorithm or artificial intelligence implemented by the task facilitation service 102 may automatically, and in real-time, process this message from the representative 104 to determine that the member's account credentials and/or payment information may be required in order to complete a checkout process for the requested items in the virtual card. As another illustrative example, when the representative 104 defines the particular task that is to be performed on behalf of the member 110, the machine learning algorithm or artificial intelligence may automatically evaluate the task to identify any possible operations associated with the task that may require sensitive information from the member 110.

The machine learning algorithm or other artificial intelligence may be dynamically trained in real-time using supervised training techniques. For instance, a dataset of input messages, corresponding projects/tasks (including any associated operations), and member information used to complete the projects/tasks can be selected for training of the machine learning algorithm or artificial intelligence. This dataset may include hypothetical data (e.g., hypothetical input messages, projects/tasks, member information, etc.), actual historical data (e.g., historical input messages, corresponding projects/tasks, actual member information associated with the projects/tasks, etc.), or a combination thereof. The machine learning algorithm or artificial intelligence may be evaluated to determine, based on the sample inputs supplied to the machine learning algorithm or artificial intelligence, whether the machine learning algorithm or artificial intelligence is accurately identifying the need for sensitive information associated with a member based on the sample input messages and corresponding project/task. Based on this evaluation, the machine learning algorithm or artificial intelligence may be modified to increase the likelihood of the machine learning algorithm or artificial intelligence accurately identifying the need for particular types of sensitive information that may be required for completion of a project or task.

The machine learning algorithm or artificial intelligence may further be dynamically trained in real-time by soliciting feedback from members and representatives associated with the task facilitation service 102 with regard to requests for sensitive information for completion of tasks and/or projects. For example, if the task facilitation service 102 determines that the machine learning algorithm or artificial intelligence has failed to recognize the need for particular sensitive information for completion of one or more operations associated with a particular task or project, the task facilitation service 102 may use this feedback to retrain the machine learning algorithm or artificial intelligence to better identify the need for particular sensitive information for similar tasks and/or projects. Alternatively, if the task facilitation service 102 determines that the machine learning algorithm or artificial intelligence has accurately recognized the need for particular sensitive information for completion of one or more operations associated with a particular task or project, the task facilitation service 102 may use this feedback to reinforce the machine learning algorithm or artificial intelligence such that, for similar tasks or projects, the machine learning algorithm or artificial intelligence will be likely to provide an indication of the required sensitive information for these tasks or projects.

In some instances, the machine learning algorithm or other artificial intelligence may be additionally, or alternatively, trained using a dataset of input tasks and/or projects, corresponding operations, and any information used to complete these operations. The machine learning algorithm or artificial intelligence may be evaluated to determine, based on these sample inputs, whether the machine learning algorithm or artificial intelligence is accurately identifying the required information for completion of the operations associated with the sample input tasks and/or projects. Through this evaluation, the task facilitation service 102 may retrain or reinforce the machine learning algorithm or artificial intelligence such that the accuracy in determining whether sensitive information is required for a particular task or project when the particular task or project is initially defined by the representative 104.

It should be noted that the machine learning algorithm or artificial intelligence may be dynamically trained, in real-time, to continuously, and automatically, process and monitor messages exchanged between different members and representatives as these messages are exchanged in real-time over different corresponding communications sessions to determine, for these communications sessions, whether any sensitive information may be needed for completion of tasks. This continuous processing and monitoring of these different communications sessions and corresponding messages as these messages are exchanged may be performed independently and in parallel for myriad active communications sessions amongst different members and representatives in real-time. Further, the machine learning algorithm or artificial intelligence may be continuously updated, in real-time, as determinations are made regarding sensitive information that may be required for different tasks or projects corresponding to different communications sessions and as actions are performed based on these determinations (e.g., solicitations for sensitive information are provided based on generated determinations, generated determinations are discarded based on actual review of corresponding tasks, etc.). Thus, based on outcomes resulting from determinations corresponding to sensitive information that may be required for completion of tasks (e.g., resulting solicitations for sensitive information, determinations that sensitive information was not required, etc.), the machine learning algorithm or artificial intelligence may be continuously, and dynamically, updated in real-time to improve or reinforce the accuracy of the machine learning algorithm or artificial intelligence in generating determinations corresponding to sensitive information that may be required for different tasks and projects identified from ongoing communications sessions between members and representatives.

In an embodiment, if the representative 104 or the machine learning algorithm/artificial intelligence implemented by the task facilitation service 102 determines that sensitive information associated with the member 110 is required for completion of one or more operations associated with a particular task or project, the representative 104 can transmit, through the communications session 116, a link 120 to a form that the member 110 may select to provide the required sensitive information. The link 120 may be associated with a data privacy vault 108, which may be implemented to securely store and isolate sensitive information on behalf of the task facilitation service 102. Further, the data privacy vault 108 may provide various access controls in order to facilitate access to the sensitive information only to users that are authorized to access such sensitive information. These access controls may be defined by the task facilitation service 102, which may provide or generate a set of credentials for different users that may be authorized by the task facilitation service 102 to access sensitive information stored in the data privacy vault 108.

As illustrated in FIG. 1, the representative 104, through the communications session 116, may indicate (such as through message 118) that they have added all of the items associated with a shopping list to the member's virtual cart. However, in order for these items to be purchased from the online retailer, the member 110 may be required to provide their account credentials associated with the online retailer. As noted above, the representative 104 may be prevented from viewing or otherwise accessing these account credentials on behalf of the member 110. Accordingly, the representative 104 may generate and present a link 120 to the data privacy vault 108, through which the member 110 may record their account credentials.

In an embodiment, the representative 104 can transmit a request to the data privacy vault 108 to generate a link 120 that may be presented to the member 110 and that may be used by the member 110 to provide their account credentials or other sensitive information that may be used to complete the particular task or project. For instance, the representative 104 may access the data privacy vault 108 and select a particular type or category for the sensitive information that is required from the member 110. As an illustrative example, when the representative 104 accesses the data privacy vault 108, the data privacy vault 108 may provide the representative 104 with different sensitive information categories from which the representative 104 may select a particular category associated with the sensitive information that is to be requested from the member 110. When the representative 104 selects a particular category, the data privacy vault 108 may present the representative 104 with a form associated with the particular category, through which the representative 104 may provide a description or name for the sensitive information that is to be provided. For example, the representative 104 may assign the name "Brand Shopping Account," which may be used to denote that the sensitive information to be provided corresponds to the member's shopping account associated with the stated brand. In some instances, while the representative 104 may be permitted to assign a description or name for the sensitive information that is to be provided by the member 110, the representative 104 may be prevented from inputting any sensitive information into the form or to otherwise access any sensitive information maintained by the data privacy vault 108. For example, if the form includes a sensitive information entry field, the data privacy vault 108 may disable this field for the representative 104 in order to prevent the representative 104 from inputting any information into the sensitive information entry field.

In some instances, the data privacy vault 108 may provide an application programming interface (API) through which the representative 104 may define the name or description for the sensitive information that is to be provided by the member 110 for the particular task or project. Through an API call to the data privacy vault 108, the representative 104 may provide the name or description for the sensitive information, as well as contact information associated with the member 110 that can be used by the data privacy vault 108 to contact the member 110 in order to obtain and securely store the sensitive information associated with the member 110.

Once the representative 104 has defined the name or description for the sensitive information that is to be provided by the member 110, the data privacy vault 108 may provide a link 120 to the corresponding form to the member 110 for entry of the sensitive information. As illustrated in FIG. 1, the link 120 to the form may be provided to the member 110 through the communications session 116 with the representative 104. If the member 110 selects the link 120, the member 110 may be redirected to the data privacy vault 108, through which the member 110 may access the form generated by the representative 104 for entry of the requested sensitive information. The form may be presented to the member 110 without exposing the form or any information added to the form to the representative 104. For instance, as the member 110 provides their sensitive information through the form, the representative 104 may be prevented from obtaining any information corresponding to the member's entry of the sensitive information into the form (e.g., key entries, plaintext entries, the form itself, etc.). Further, once the member 110 has submitted their sensitive information through the provided form, the member 110 may be prevented from accessing this sensitive information. This may prevent exposure of the sensitive information to unauthorized entities, such as an unauthorized entity that has gained access to the member's computing device 112 or account associated with the task facilitation service 102.

In an embodiment, if the member 110 completes entry of their sensitive information through the provided form, the data privacy vault 108 transmits a notification to the representative 104 to indicate that the member 110 has provided the requested sensitive information. This notification may be provided to the representative 104 without including the sensitive information provided by the member 110. Further, if the representative 104 attempts to access the data privacy vault 108 to obtain the sensitive information, the data privacy vault 108 may prevent the representative 104 from accessing the sensitive information. For example, the data privacy vault 108 may implement one or more policy controls whereby only authorized entities assigned to a particular role (e.g., high-trust roles, authorized roles, etc.) may access sensitive information stored therein. In some instances, the data privacy vault 108 may require a set of credentials (e.g., username and password, cryptographic token, etc.) that can be validated to determine whether access is to be granted to the sensitive information. Any attempt to access the sensitive information stored in the data privacy vault 108 may be logged in order to audit authorized and unauthorized attempts to access sensitive information stored in the data privacy vault 108 and to accordingly perform any required remedial actions (e.g., revoke access to sensitive information, perform disciplinary actions for unauthorized attempts to access sensitive information, etc.).

In an embodiment, the representative 104, upon receiving an indication from the data privacy vault 108 that the member 110 has provided the requested sensitive information, can transfer the particular task or project to a high-trust representative 106 for completion of the task or project. For instance, the representative 104 may transfer the communications session 116 to the high-trust representative 106, whereby the high-trust representative 106 may be able to review all previously exchanged communications between the member 110 and the representative 104 for the particular task or project, including the request (e.g., link 120) provided to the member 110 to provide their sensitive information. In some instances, through a representative console, the high-trust representative 106 may review what operations have been performed on behalf of the member 110 for the particular task or project. Further, through this representative console, the high-trust representative 106 may identify the category or type of sensitive information submitted by the member 110 through use of the provided link 120 or other access through the data privacy vault 108.

A high-trust representative 106 may be a representative that is authorized to access sensitive information associated with members of the task facilitation service 102 in order to perform various tasks or projects on behalf of these members. A high-trust representative 106 may be vetted by the task facilitation service 102 in order to reduce the likelihood of sensitive information maintained in the data privacy vault 108 from being exposed (intentionally or unintentionally) to unauthorized entities. For instance, a high-trust representative 106 may be required to pass an extensive background check before being granted access to the data privacy vault 108 to access any sensitive information. In some instances, access to the data privacy vault 108 by a high-trust representative 106 may be facilitated only through a secure computing environment (e.g., a computing environment with controlled storage and network access, a cryptographically secure environment, an isolated network environment, etc.).

In an embodiment, access to sensitive information within the data privacy vault 108 is provided on a "need to know" basis, whereby a high-trust representative 106 is granted access only to the sensitive information required for performance of the task or project transferred to the high-trust representative 106. For example, when transferring a task or project to the high-trust representative 106, the representative 104 may indicate what sensitive information is required for the task or project (e.g., an identifier corresponding to the form or request for sensitive information provided to the member 110, an identifier corresponding to the name or description provided by the representative 104 for the sensitive information, etc.). This identifier may be used to generate a unique set of credentials or cryptographic token that may be used by the high-trust representative 106 for the sole purpose of retrieving the required sensitive information for the task or project. For example, if the high-trust representative 106, through the representative console, selects an option to access sensitive information from the data privacy vault 108 for the particular task or project, the data privacy vault 108 may process the associated credentials or cryptographic token to determine what sensitive information is available to the high-trust representative 106.

The high-trust representative 106 may access the data privacy vault 108 to obtain the required sensitive information for performance of one or more operations associated with the task or project transferred to the high-trust representative 106. For example, through the representative console, the high-trust representative 106 may select an option to access the data privacy vault 108 in order to retrieve the sensitive information that may be needed for the task or project. Selection of this presented option may cause the task facilitation service 102 to redirect the high-trust representative 106 to the data privacy vault 108. Through the data privacy vault 108, the high-trust representative 106 may select the particular type or category for the sensitive information that is being retrieved. For example, if the high-trust representative 106 requires the member's account credentials for a particular brand, the high-trust representative 106 may select the type or category corresponding to brand-specific account credentials.

If the high-trust representative 106 selects a particular type or category, the data privacy vault 108 may prompt the high-trust representative 106 to provide their set of credentials for accessing sensitive information from the data privacy vault 108. The data privacy vault 108 may evaluate this set of credentials to determine whether the set of credentials are valid and, if so, whether the high-trust representative 106 is authorized to access sensitive information corresponding to the selected type or category. As noted above, the high-trust representative 106 may be issued with a set of credentials or cryptographic token that may be used by the high-trust representative 106 for the sole purpose of retrieving the required sensitive information for the task or project. Thus, the set of credentials or cryptographic token may be specific to particular sensitive information associated with a specific type or category. If the high-trust representative 106 attempts to access a type or category that is different from the type or category associated with the sensitive information that the high-trust representative 106 has been granted access to, the data privacy vault 108 may automatically deny the request to access the selected type or category.

If the high-trust representative 106 selects the particular type or category associated with the sensitive information that the high-trust representative 106 has been granted access to, the data privacy vault 108 may present the available sensitive information to the high-trust representative 106. For example, the data privacy vault 108 may present the completed form submitted by the member 110 in response to the prompt from the representative 104 for entry of this sensitive information. The completed form may include the plaintext representation of the sensitive information such that the high-trust representative 106 may be able to review the sensitive information. However, the sensitive information may not be made available to the representative 104, the member 110, or any other unauthorized entity.

In an embodiment, access to the sensitive information through the data privacy vault 108 is provided for a limited period of time whereby after the limited period of time has elapsed, access to the sensitive information is automatically revoked for the high-trust representative 106. For example, when a task or project is transferred to the high-trust representative 106 for performance of one or more operations requiring access and use of sensitive information associated with the member 110, the task facilitation service 102 may provide the high-trust representative 106 with an indication of the amount of time that the sensitive information may be made available to the high-trust representative 106 through the data privacy vault 108. Once this amount of time has elapsed, the set of credentials or cryptographic token usable to access the sensitive information may be automatically revoked, thereby preventing the high-trust representative 106 from accessing the sensitive information unless the high-trust representative 106 submits a request to the task facilitation service 102 to be granted renewed access to the sensitive information.

Access to the sensitive information through the data privacy vault 108 may be logged such that an auditor associated with the task facilitation service 102 may determine when sensitive information has been accessed and by whom. For instance, if the task facilitation service 102 determines that particular sensitive information has been leaked to an unauthorized entity, the task facilitation service 102 may review the logs maintained by the data privacy vault 108 to determine which high-trust representative(s) have previously accessed the leaked sensitive information. This may allow the task facilitation service 102 to home in on the particular entities that may have had access to the sensitive information and tailor its investigation accordingly.

Using the sensitive information from the data privacy vault 108, the high-trust representative 106 may perform one or more operations associated with the task or project. For example, the high-trust representative 106 may use the sensitive information to log into the member's third-party service account (e.g., an account associated with a particular brand, an account associated with a particular retailer or point-of-sale, etc.) to complete a checkout process. As another illustrative example, if the sensitive information includes payment information (e.g., credit card number, CVV, etc.) associated with the member 110, the high-trust representative 106 may use this sensitive information to submit a payment to a third-party service 114 for performance of the one or more operations associated with the task or project. As yet another illustrative example, if the sensitive information includes health insurance information associated with the member 110 that may be provided for a task or project associated with a medical procedure or visit, the high-trust representative 106 may obtain and provide this health insurance information on behalf of the member 110 to a medical practitioner, pharmacy, or other authorized entity (e.g., third-party service 114) that may require the member's health insurance information.

In an embodiment, the task facilitation service 102 allows the high-trust representative 106 to communicate directly with the member 110, such as through the communications session 116. For instance, if the high-trust representative 106 encounters any issues related to the sensitive information previously provided by the member 110 (e.g., the sensitive information cannot be used to access a member account, the sensitive information is missing necessary information for performance of the one or more operations, the sensitive information includes one or more typographical errors, etc.), the high-trust representative 106, over the communications session 116, may communicate with the member 110 to address these issues. This may include providing the member 110 with a new link 120 to enter their sensitive information through the data privacy vault 108 and removing any previously provided sensitive information that may have errors or be associated with one or more issues corresponding to performance of the one or more operations by the high-trust representative 106. The high-trust representative 106 may further communicate with the member 110 over the communications session 116 to address any issues related to the task or project itself. For instance, the high-trust representative 106 may prompt the member 110 with regard to any possible substitutions to an order, to provide any one-off codes related to multi-factor authentication requests from a third-party service 114, and the like.

Once the high-trust representative 106 has completed performing the one or more operations requiring use of the sensitive information, the high-trust representative 106 may transfer the task or project to the representative 104. Any sensitive information used by the high-trust representative 106 may be obfuscated from the representative console utilized by the representative 104 in order to prevent exposure of the sensitive information to the representative 104. The representative 104 may perform any remaining operations associated with the task or project on behalf of the member 110 without having access to the sensitive information previously used by the high-trust representative 106.

It should be noted that for the processes described herein, various operations performed by the representative 104 and/or the high-trust representative 106 may be additionally, or alternatively, performed using one or more machine learning algorithms or artificial intelligence. For example, as the representative 104 and the high-trust representative 106 perform or otherwise coordinate performance of projects and tasks on behalf of a member 110 over time, the task facilitation service 102 may continuously and automatically update the member's profile according to member feedback related to the performance of these projects and tasks by the representative 104, the high-trust representative 106, and/or third-party services 114. In an embodiment, the task facilitation service 102, after a member's profile has been updated over a period of time (e.g., six months, a year, etc.) or over a set of projects and tasks (e.g., twenty tasks, thirty tasks, etc.), may utilize a machine learning algorithm or artificial intelligence to automatically and dynamically generate new projects and tasks based on the various attributes of the member's profile (e.g., historical data corresponding to member-representative communications, member feedback corresponding to representative performance and presented tasks/proposals, etc.) with or without representative interaction. The task facilitation service 102 may automatically communicate with the member 110 to obtain any additional information required for new projects and tasks and automatically transfer these projects and tasks to a high-trust representative 106 when sensitive information is required for performance of one or more operations associated with these projects and tasks. The representative 104 may monitor communications between the task facilitation service 102 and the member 110 to ensure that the conversation maintains a positive polarity (e.g., the member 110 is satisfied with its interaction with the task facilitation service 102 or bot, etc.). If the representative 104 determines that the conversation has a negative polarity (e.g., the member 110 is expressing frustration, the task facilitation service 102 or bot is unable to process the member's responses or asks, etc.), the representative 104 may intervene in the conversation. This may allow the representative 104 to address any member concerns and perform any projects and tasks on behalf of the member 110.

Thus, unlike automated customer service systems and environments, wherein these systems and environment may have little to no knowledge of the users interacting with agents or other automated systems, the task facilitation service 102 can continuously update the member profile to provide up-to-date historical information about the member 110 based on the member's automatic interaction with the system or interaction with the representative 104/high-trust representative 106 and on the projects and tasks performed on behalf of the member 110 over time. This historical information, which may be automatically and dynamically updated as the member 110 or the system interacts with the representative 104/high-trust representative 106 and as projects and tasks are devised, proposed, and performed for the member 110 over time, may be used by the task facilitation service 102 to anticipate, identify, and present appropriate or intelligent responses to member 110 queries, needs, and/or goals.

Figure 2A:
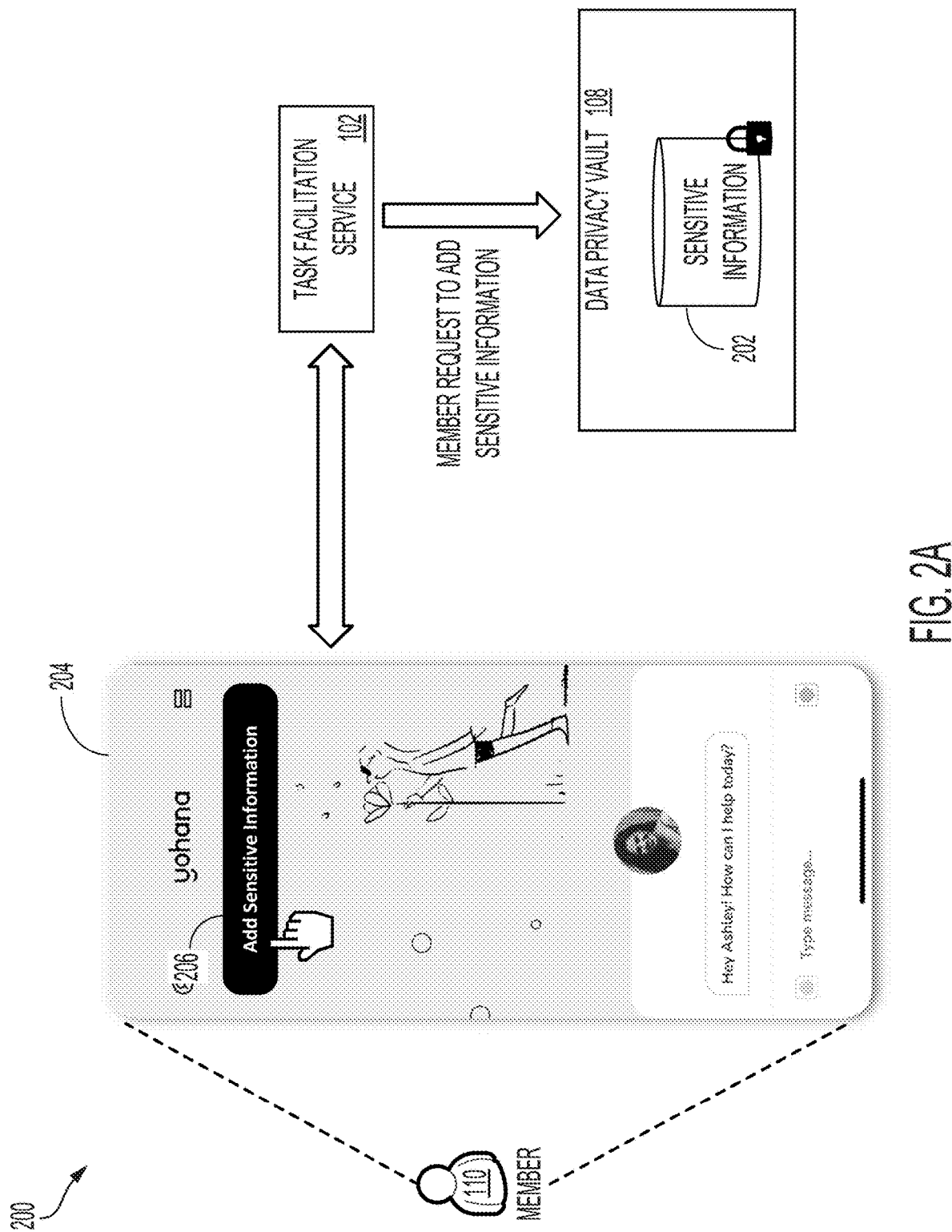
FIGS. 2A-2C show an illustrative example of an environment in which a member associated with a task facilitation service adds sensitive information to a data privacy vault for use in performance of different tasks in accordance with at least one embodiment.
Figure 2B:
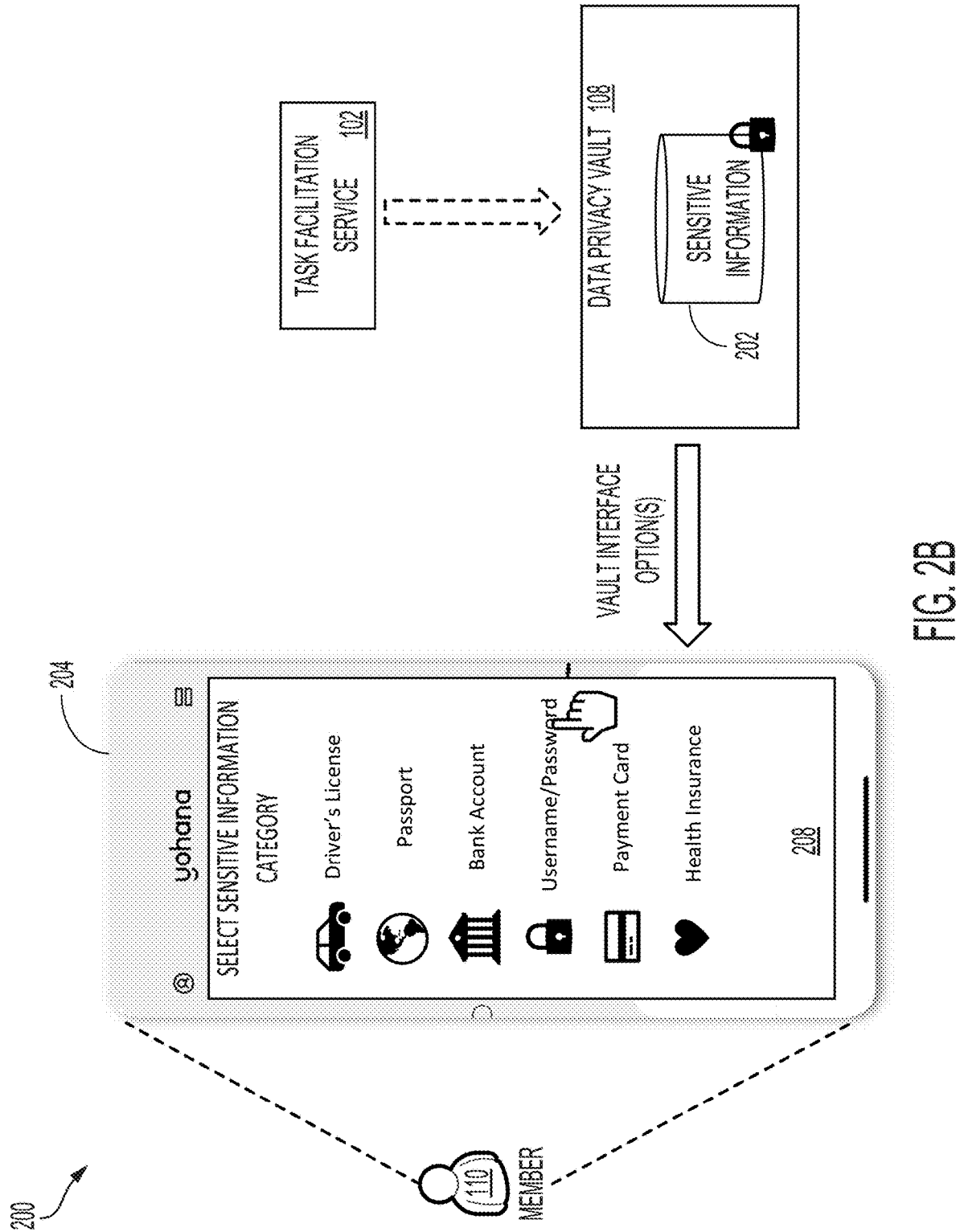
Figure 2C:
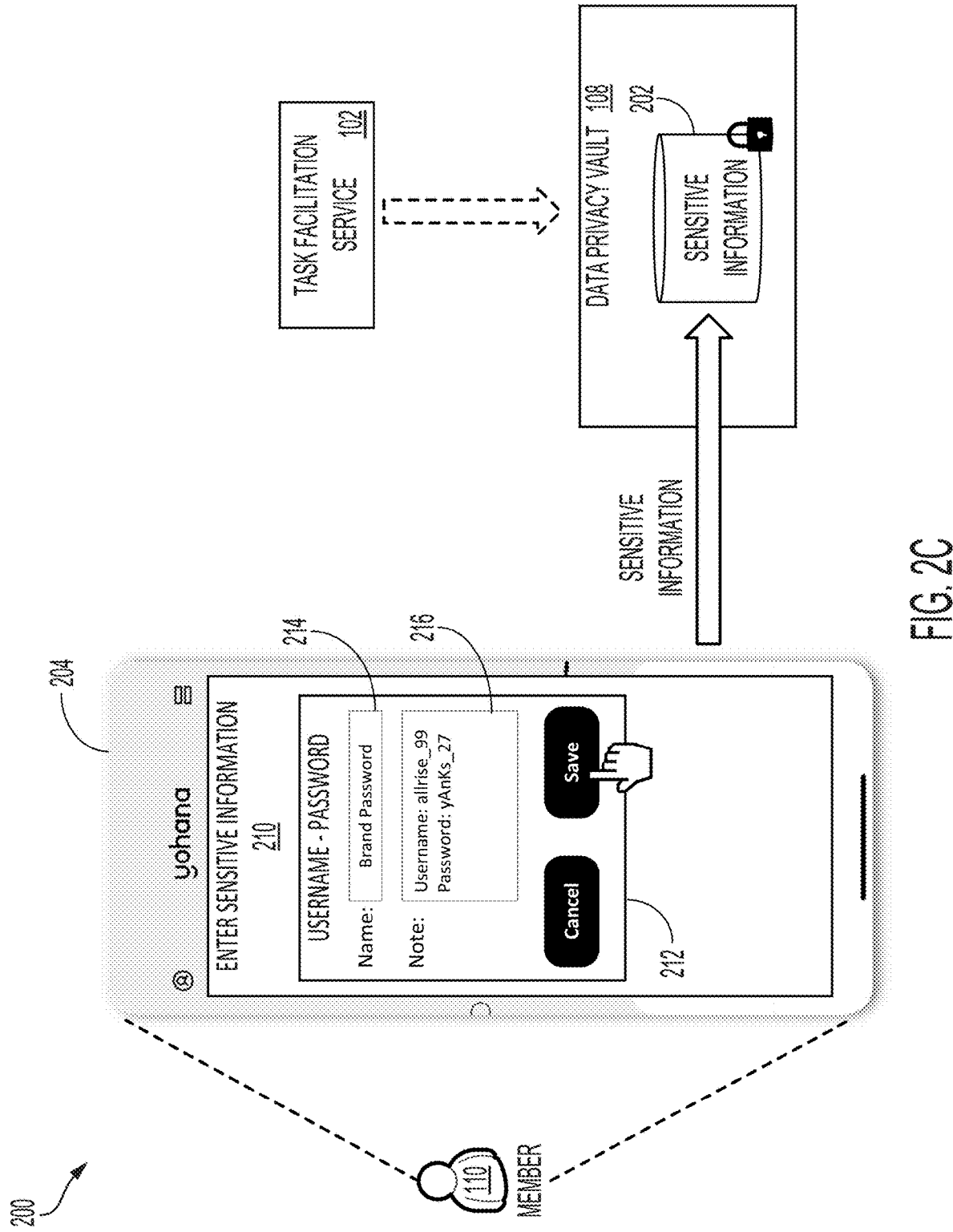

FIGS. 2A-2C show an illustrative example of an environment 200 in which a member 110 associated with a task facilitation service 102 adds sensitive information to a data privacy vault 108 for use in performance of different tasks in accordance with at least one embodiment. In the environment 200, the member 110 may be provided with an interface 204 through which the member 110 may communicate with a representative through a communications session facilitated by the task facilitation service 102, define and request performance of new tasks or projects on behalf of the member 110, update a member profile associated with the member 110, and the like.

In an embodiment, the task facilitation service 102, through the interface 204, can further provide the member 110 with an option to add sensitive information to a data privacy vault 108 for use with various tasks and/or projects that may be performed on behalf of the member. For example, as illustrated in FIG. 2A, the task facilitation service 102, through the interface 204, may present an add sensitive information button 206 that, when selected, may allow the member 110 to provide any sensitive information that may be used for the performance of various tasks and/or projects on behalf of the member 110.

It should be noted that while an add sensitive information button 206 is used extensively throughout the present disclosure for the purpose of illustration, additional and/or alternative elements may be integrated into the interface 204 to allow the member 110 to request access to the data privacy vault 108 to add sensitive information associated with the member 110. For example, the task facilitation service 102 may provide, through the interface 204, a drop-down menu that includes various options for managing the member's account. This may include an option to access the member's profile in order to add or correct any information associated with the member 110 collected during an onboarding process and/or during the performance of one or more tasks and projects on behalf of the member 110. Further, the drop-down menu may include an option to access the data privacy vault 108 to provide any sensitive information that may be used for the performance of different tasks and projects on behalf of the member 110. In some instances, the task facilitation service 102 may not provide an option to access the data privacy vault 108 such that the member 110 may be required to communicate with their assigned representative to request access to the data privacy vault to enter their sensitive information.

If the member 110 selects the add sensitive information button 206, the task facilitation service 102 may transmit a request to the data privacy vault 108 to present, through the interface 204, one or more options for entry of the sensitive information. These one or more options may correspond to different categories or types of sensitive information that may be maintained by the data privacy vault 108 within a sensitive information datastore 202. For example, as illustrated in FIG. 2B, the data privacy vault 108 may update the interface 204 to present a sensitive information category selection window 208, through which the member 110 may select a particular category or type of sensitive information that is to be entered. The sensitive information category selection window 208, as illustrated in FIG. 2B, may include different available categories or types of sensitive information that may be entered (e.g., driver's license information, passport information, bank account information, account credentials, payment card information, health insurance information, etc.). Each particular category may be associated with a corresponding form through which the member 110 may provide their sensitive information. For example, a form associated with the health insurance category may include one or more input fields that may correspond to health insurance information that may be provided (e.g., health insurance member identifier, processor control number, issuer identification number, etc.). As another illustrative example, a form associated with the driver's license category may include one or more input fields that may correspond to the member's driver's license (e.g., state of issue, identification number, member address, date of birth, expiration date, date of issuance, any restrictions, etc.). As yet another illustrative example, a form associated with a payment card with include one or more input fields that may correspond to a payment card, such as a credit or debit card (e.g., name as printed on the card, card number, CVV, expiration date, etc.).

When the member 110 selects a particular category or type for the sensitive information that is to be provided to the data privacy vault 108, the data privacy vault 108 may update the interface 204 to present the member 110 with a corresponding form that may be used to provide the sensitive information. For example, as illustrated in FIG. 2C, the member 110 has selected the category corresponding to a username and password for a particular account. The corresponding form window 210 presented through the interface 204 may include the sensitive information entry form 212. As illustrated in FIG. 2C, the sensitive information entry form 212 may include a name field 214, through which the member 110 may provide a name that may be associated with the provided sensitive information. For example, through the name field 214 of the sensitive information entry form 212, the member 110 may indicate that the sensitive information being provided is the username and password for their account associated with a particular brand (e.g., "Brand Password" as indicated in the name field 214).

In addition to the name field 214, the data privacy vault 108 may provide, through the sensitive information entry form 212, a notes field 216 that may be used by the member 110 to input the sensitive information that is to be stored in the sensitive information datastore 202. As noted above, the data privacy vault 108 may provide different forms for different categories or types of sensitive information that may be added to the data privacy vault 108. Thus, the notes field 216 may differ for different sensitive information categories or types and may include one or more input fields, accordingly. For example, as illustrated in FIG. 2C, the notes field 216 corresponding to the username and password category may include a single input field through which the member 110 can enter both their username and password for a particular account. However, in some instances, the notes field 216 may include multiple input fields, which may be delineated according to the portion of sensitive information that may be provided. As an illustrative example, if the member 110 is providing their driver's license information, the notes field 216 may include an input field for the state from which the driver's license was issued, an input field for the driver's license number, an input field corresponding to the date of issuance, an input field corresponding to the expiration date, and the like. Thus, the data privacy vault 108 may customize each form according to the corresponding sensitive information category or type.

In an embodiment, once the member 110 has completed entering their sensitive information through the sensitive information entry form 212, the data privacy vault 108 can store the provided sensitive information in the sensitive information datastore 202. The sensitive information datastore 202 may store the provided sensitive information in association with the member 110 and the particular category or type for the sensitive information. For example, a query for provided sensitive information may require a set of credentials or cryptographic token that is associated with both a member identifier (e.g., username, as maintained by the task facilitation service 102) and the category or type associated with the sensitive information (e.g., driver's license, username/password, payment card, health insurance, etc.). If a representative assigned to the member 110 generates a new task or project for which the member's sensitive information may be required, the representative may indicate the category or type associated with the sensitive information that may be needed for performance of the task or project. The task facilitation service 102, in an embodiment, can generate a set of credentials or cryptographic token that incorporates the member's username and the category or type associated with this sensitive information such that a high-trust representative can submit the set of credentials or cryptographic token to retrieve this sensitive information from the sensitive information datastore 202.

The sensitive information datastore 202 may provide secure storage for any provided sensitive information. For example, the sensitive information datastore 202 may be encrypted such that no unauthorized entity may be able to access the sensitive information datastore 202 and obtain any sensitive information stored therein without providing a valid set of credentials or cryptographic token. As noted above, this set of credentials or cryptographic token may be made available only to high-trust representatives on a "need to know" basis. This may prevent other representatives (such as a representative originally assigned to the member 110) and the member 110 from accessing any sensitive information once the sensitive information has been stored in the sensitive information datastore 202. This may reduce the risk of any entered sensitive information from being exposed (intentionally or unintentionally) to unauthorized entities.

In an embodiment, the member 110 can access the data privacy vault 108 to remove any previously provided sensitive information from the sensitive information datastore 202. For example, the member 110, through the interface 204, may access the data privacy vault 108 to submit a query to identify what sensitive information is stored in the sensitive information datastore 202 on behalf of the member 110. In response to the query, the data privacy vault 108 may present the member 110 with the identifiers or names previously provided by the member 110 for the different sensitive information stored within the sensitive information datastore 202. However, the data privacy vault 108 may not provide any of the sensitive information associated with each of these identifiers or names, as noted above. The member 110, through the interface 204, may select a particular identifier or name corresponding to sensitive information stored in the sensitive information datastore 202 and request deletion of the sensitive information. Thus, the member 110 may manage their sensitive information while being prohibited from reviewing the actual sensitive information stored in the sensitive information datastore 202.

FIGS. 3A-3D show an illustrative example of an environment 300 in which a representative 104 prompts a member to provide sensitive information for completion of a task and transfers the task to a high-trust representative 106 that can access the sensitive information and complete the task in accordance with at least one embodiment. In the environment 300, a representative 104 may be in communication with a member through a communications session 116 associated with a particular task or project that is to be performed on behalf of the member. The communications session 116 may be presented through the interface 204 provided by the task facilitation service 102 to the member. For example, the interface 204 may be accessible through an application provided by the task facilitation service 102 and implemented on the member's computing device (e.g., smartphone, computer system, etc.). Additionally, or alternatively, the interface 204 may be accessible through a web portal or other website provided by the task facilitation service 102.

The communications session 116 may be facilitated between the member and the representative 104 using information from a user datastore 304. For instance, when a new communications session 116 is established between a representative 104 and a particular member, the task facilitation service 102 can generate and assign a unique identifier to the new communications session 116. This unique identifier for the new communications session 116 may be associated with a member entry within the user datastore 304, whereby messages exchanged over the communications session 116 are automatically entered and stored in association with the member entry. As described in greater detail herein, the unique identifier can be provided to a high-trust representative 106 when a task or project being performed for the benefit of the member is transferred to the high-trust representative 106 for performance of one or more operations that require access to and use of sensitive information associated with the member. Further, the parameters associated with the task or project may be stored within a task datastore 306 maintained by the task facilitation service 102. Thus, when a task or project being performed for the benefit of the member is transferred to the high-trust representative 106, the high-trust representative 106 may retrieve the parameters associated with the task or project from the task datastore 306.

Through the communications session 116, the representative 104 may communicate with the member to obtain any information that may be used for completion of a particular task or project, as well as to provide updates related to the performance of the particular task or project. For example, through a message 118 provided to the member over the communications session 116, the representative 104 may indicate that they have added all of the items requested by the member into a virtual cart for checkout. Further, the representative 104, through the message 118, may indicate that they require the member's account information associated with the brand from which these items are being purchased in order to complete the checkout process. The member's account information associated with the brand may be sensitive information and may not be made available to the representative 104, as the representative 104 is not authorized to access sensitive information associated with the member. Accordingly, the representative 104 may be required to provide the member with a link 120 to the data privacy vault 108 for entry of the required sensitive information.

In an embodiment, to provide the link 120 to the member through the interface 204, the representative 104 can submit a request to an information security system 302 implemented by the data privacy vault 108 to generate the link 120. The information security system 302 may be implemented using a computer system or application executed on a computer system associated with the data privacy vault 108. The information security system 302, in response to the form request from the representative 104, may present the representative 104 with various sensitive information categories or types for which forms are available. For example, the representative 104, through a representative console provided by the task facilitation service 102, may access the information security system 302 to submit their request for a sensitive information form that may be provided to the member. Through this representative console, the information security system 302 may present the representative 104 with the various sensitive information categories or types for which forms are available. As noted above, each sensitive information category or type may be associated with a particular form, which may have different input fields corresponding to the category or type of sensitive information that is being provided. Thus, selection of a particular sensitive information category or type may denote selection a particular form corresponding to the selected sensitive information category or type.

In response to representative selection of a particular sensitive information category or type, the information security system 302 may prompt the representative 104 for information corresponding to the member. This may include prompting the representative 104 to provide an identifier or username associated with the member. This identifier or username may correspond to the identifier or username utilized by the member for the task facilitation service 102. This may allow the information security system 302 to associate any sensitive information provided by the member with the member themselves. Further, the identifier or username may be used to tailor the link 120 that may be provided to the member such that, when the member selects the link 120, the form presented to the member may be immediately associated with the member.

In an embodiment, the task facilitation service 102 implements a machine learning algorithm or artificial intelligence that can be dynamically trained to automatically determine when sensitive information may be required for performance of a particular task or project. The machine learning algorithm or artificial intelligence may be trained using supervised, unsupervised, reinforcement, or other such training techniques. For example, a dataset comprising previously performed tasks on behalf of members of the task facilitation service 102 (as indicated through a task datastore 306) and determinations as to whether sensitive information was required for completion of these tasks may be used to identify correlations between different tasks and sensitive information without supervision and feedback (e.g., an unsupervised training technique). A machine learning data analysis algorithm may also be trained using sample or live data (e.g., sample tasks or live tasks being performed on behalf of members) to identify possible correlations between these tasks and required sensitive information. The task facilitation service 102 may thus implement a clustering algorithm to identify similar tasks, information required for the performance of these similar tasks, and the sensitivity (or lack thereof) of said information based on one or more vectors of similarity between the task being evaluated and other clusters of required information determinations. These vectors of similarity may include, but are not limited to, task type or category, type or category of information required for completion of the task, third-party entity associated with the task (e.g., retailer, service provider, etc.), and the like. In some instances, the sample dataset described above may be analyzed using a clustering algorithm to determine whether sensitive information is required for performance of the sample tasks indicated in the dataset. Thus, in some embodiments, the task facilitation service 102, through the machine learning algorithm or artificial intelligence, can perform such clustering and obtain partial matches among other clusters of sensitive information requirement determinations to identify a particular cluster and, from this cluster, determine whether sensitive information is required for performance of an underlying task.

Example clustering algorithms may include k-means clustering algorithms, fuzzy c-means (FCM) algorithms, expectation-maximization (EM) algorithms, hierarchical clustering algorithms, density-based spatial clustering of applications with noise (DB SCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, meta-learning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a dataset can be selected for training of the machine learning algorithm or artificial intelligence to facilitate identification of correlations between particular tasks and projects and the need for sensitive information for completion of these particular tasks and projects. The machine learning algorithm or artificial intelligence may be evaluated to determine, based on the sample inputs supplied to the machine learning algorithm or artificial intelligence, whether the machine learning algorithm or artificial intelligence is producing accurate correlations between different tasks/projects and the need for sensitive information for completion of these different tasks/projects. Based on this evaluation, the machine learning algorithm or artificial intelligence may be modified to increase the likelihood of the machine learning algorithm or artificial intelligence identifying the desired correlations. The machine learning model may further be dynamically trained by soliciting feedback from representatives as to the efficacy of correlations provided by the machine learning algorithm or artificial intelligence (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

In an embodiment, the dataset used to train the machine learning algorithm or artificial intelligence can further include conversation data corresponding to communications sessions previously facilitated between different members and representatives for different tasks or projects. The machine learning algorithm or artificial intelligence can be dynamically trained to identify correlations between different communications exchanged between members and representatives and determinations regarding the need for sensitive information for completion of corresponding tasks or projects. For example, if a member indicates, through a communications session, that they require assistance with meal planning for their diet, and the assigned representative subsequently purchases the member's groceries through an online grocer for which the member's account information was required in order to complete the purchase, the machine learning algorithm or artificial intelligence may be dynamically trained such that, for similar tasks or projects, the member's account information (e.g., sensitive information)

for a corresponding grocer may be required. In an embodiment, the machine learning algorithm or artificial intelligence is a Natural Language Processing (NLP) algorithm that is dynamically trained to process communications between members and representatives in real-time as these communications are exchanged to determine, in real-time, if sensitive information is required for performance of a particular task or project associated with the exchanged communications.

In an embodiment, if the machine learning algorithm or artificial intelligence determines, based on the exchanged communications and/or based on the particular task or project being performed on behalf of the member, that sensitive information may be needed for performance of the particular task or project, the machine learning algorithm or artificial intelligence can automatically access the information security system 302 to request a link 120 to a corresponding form that may be used to submit the sensitive information. In response to obtaining the link 120 from the information security system 302, the machine learning algorithm or artificial intelligence may automatically update the communications session 116 between the member and the representative 104 to present the link 120 to the member. In some instances, if the member or representative indicate, through the communications session 116 or through other feedback provided during or after performance of the particular task or project, that the link 120 was unnecessary for performance of the task or project, this feedback may be used to dynamically retrain the machine learning algorithm or artificial intelligence such that, for similar tasks and projects, the likelihood of links being provided for submitting sensitive information for these similar tasks and projects is reduced.

Figure 3A:
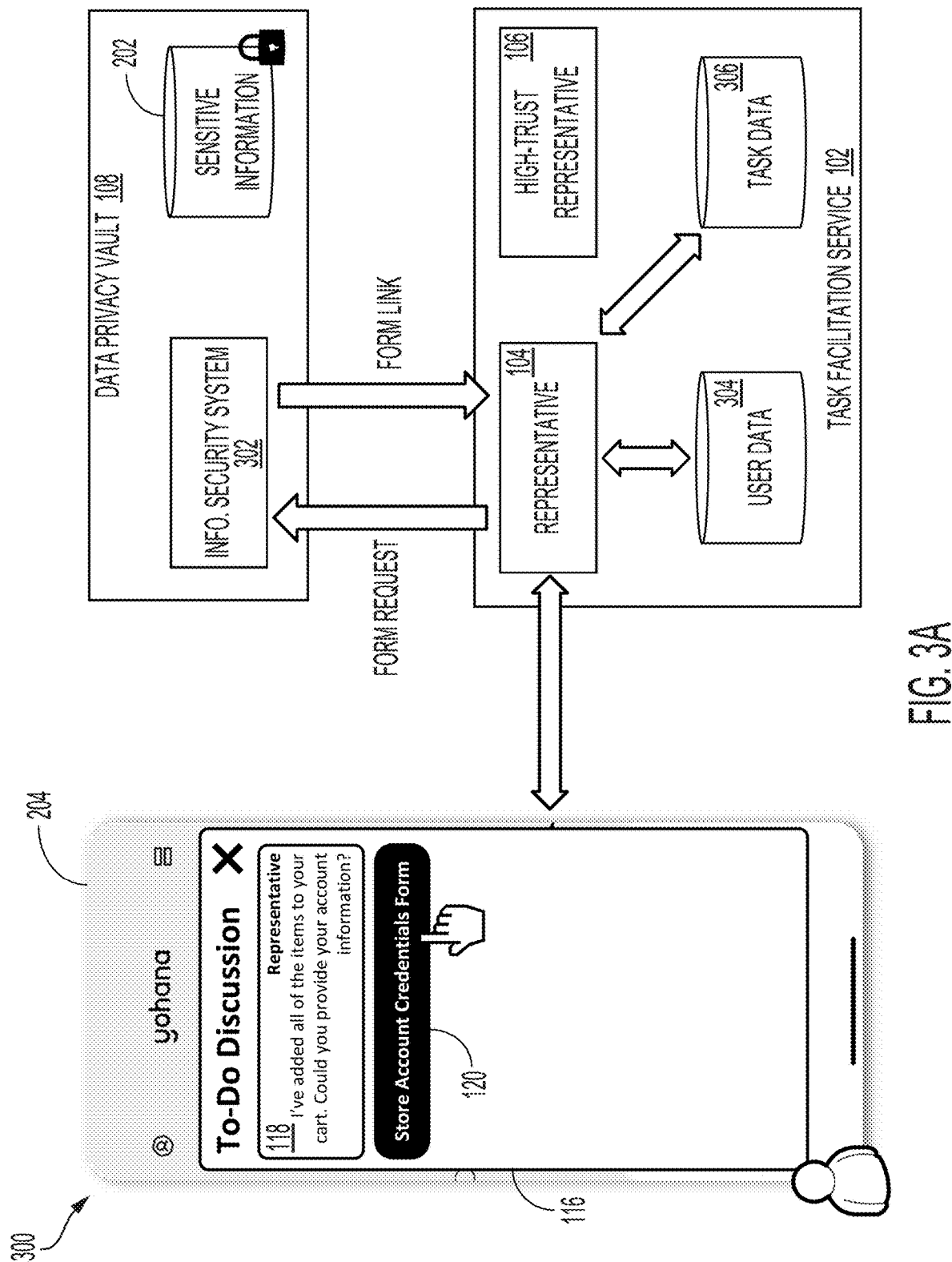
FIGS. 3A-3D show an illustrative example of an environment in which a representative prompts a member to provide sensitive information for completion of a task and transfers the task to a high-trust representative that can access the sensitive information and complete the task in accordance with at least one embodiment.
Figure 3B:
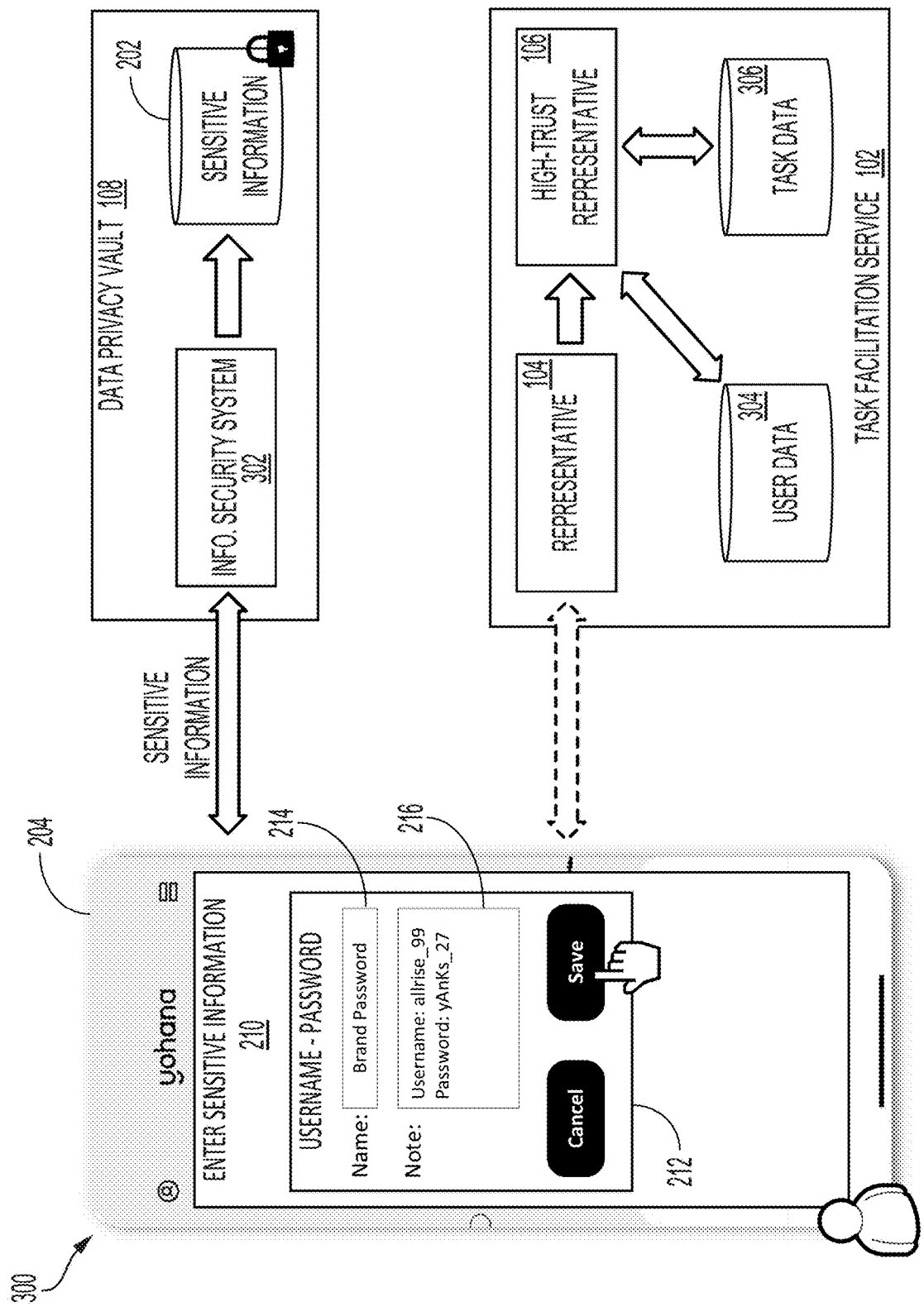
Figure 3C:
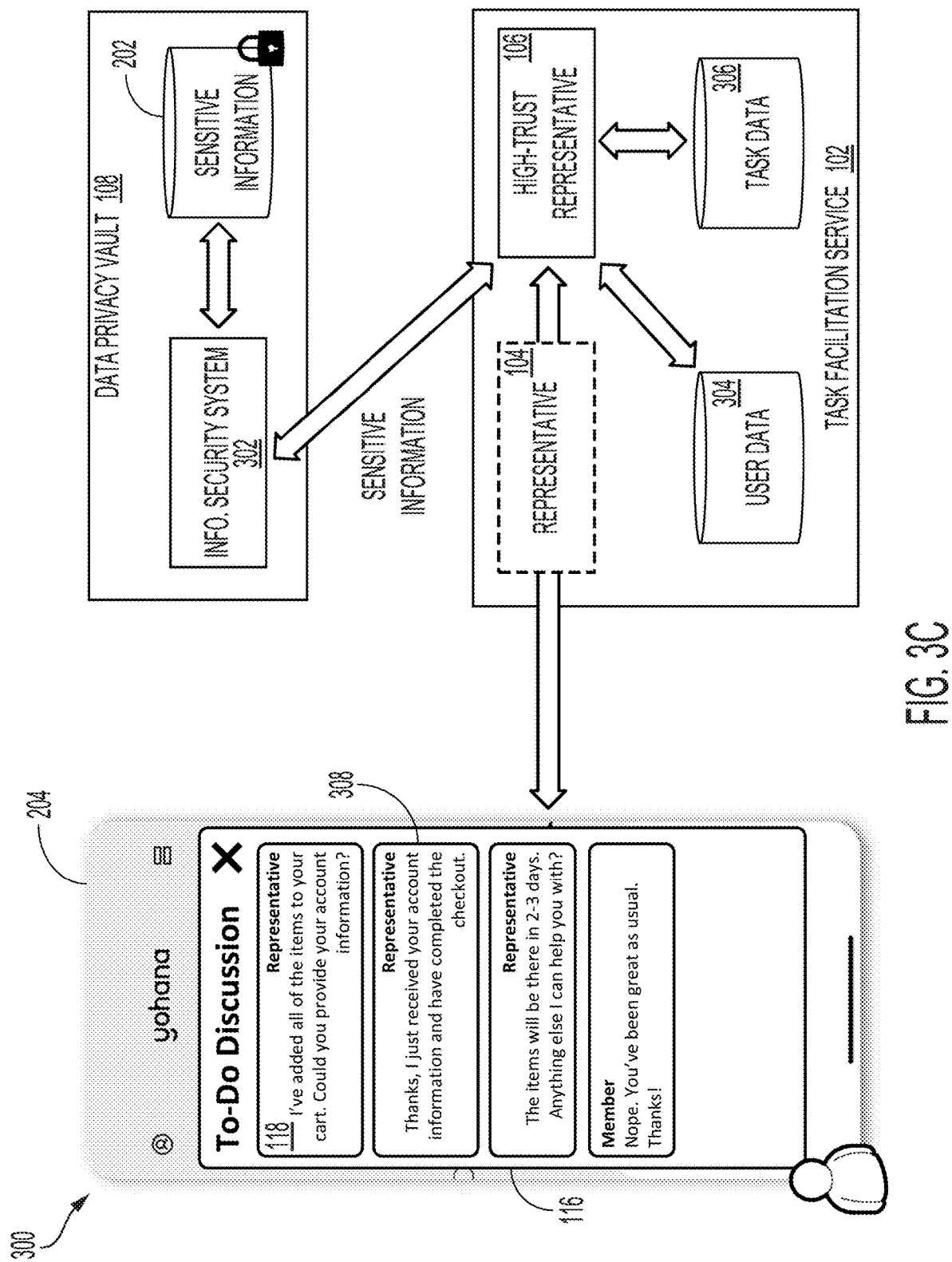
Figure 3D:
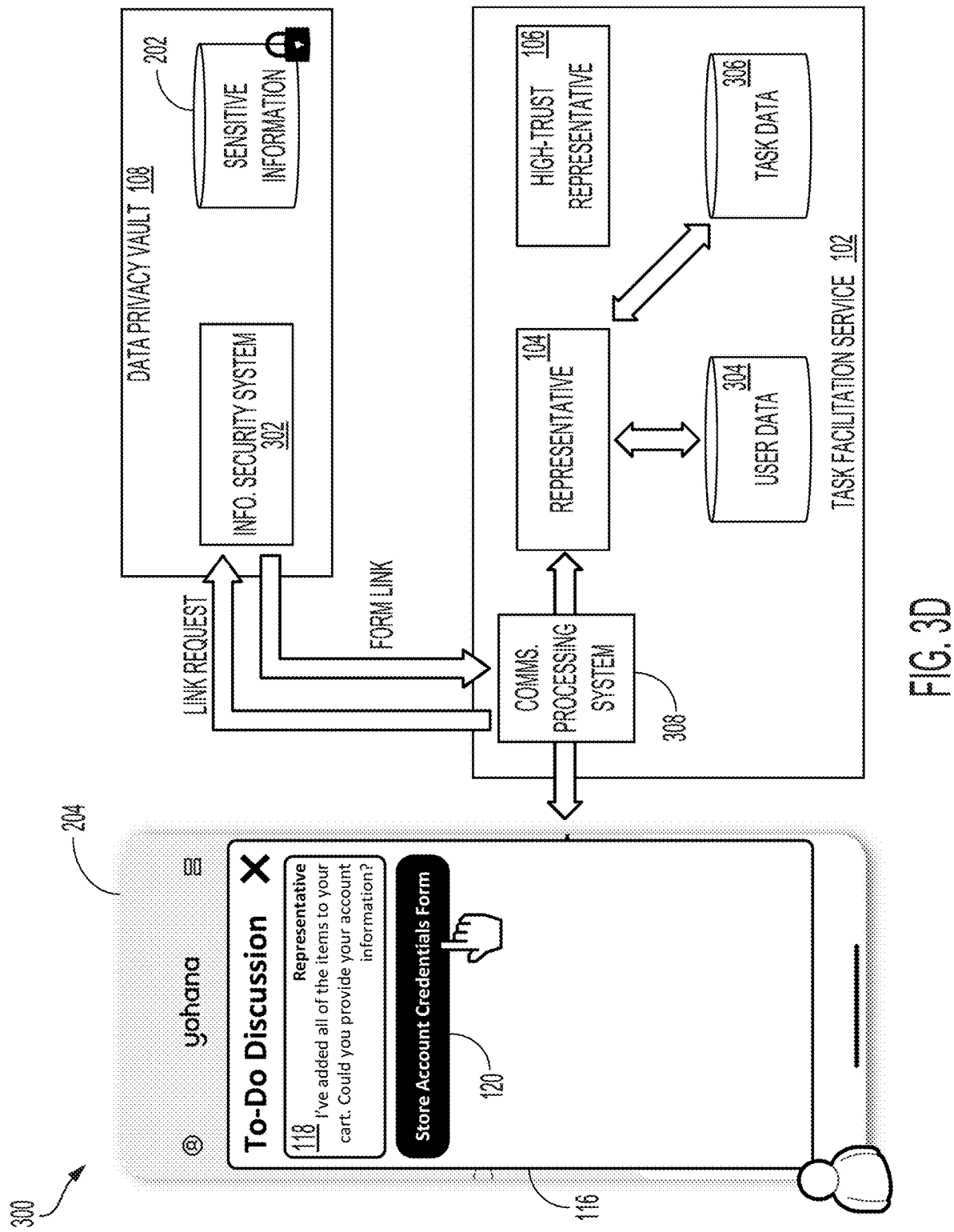

In some embodiments, as illustrated in FIG. 3D, the task facilitation service 102 implements a communications processing system 308 that is configured to automatically process communications in real-time between different members and representatives (such as the communications session between the member and the representative 104, as illustrated in FIGS. 3A-3D) to determine whether sensitive information may be required for performance of one or more sensitive operations associated with the particular task or project. The communications processing system 308 may be implemented as a special-purpose computing device that includes one or more special-purpose processors (such as the special-purpose processor described herein in FIG. 10) and other components that are specifically tailored to perform the aforementioned functionalities related to the automatic processing, in real-time, of communications sessions between members and representations and to the determination as to whether sensitive information is required based on this automatic processing of these communications sessions.

The communications processing system 308, in an embodiment, automatically monitors the communications session between the member and the representative 104 to identify any anchors or other key words that may correspond to operations associated with a present task or project for which sensitive information may be required. Returning to an earlier illustrative example, if a member indicates, through a communications session, that they require assistance with meal planning for their diet, and the assigned representative subsequently indicates that groceries may need to be purchased through an online grocer for which the member's account information is required in order to complete the purchase, the communications processing system 308 may identify any anchors or other key words associated with the need to purchase one or more items and with the online grocer to determine that sensitive information may be required to facilitate the purchase of these groceries through the online grocer.

If the communications processing system 308 detects one or more anchors or other key terms that are indicative of a need for sensitive information, the communications processing system 308, as illustrated in FIG. 3D, may automatically transmit a request to the information security system 302 to request a link 120 to a corresponding form that may be used to submit the sensitive information. In response to obtaining the link 120 from the information security system 302, the communications processing system 308 may automatically update the communications session 116 between the member and the representative 104 to present the link 120 to the member.

If the member selects the link 120 presented through the communications session 116, the information security system 302 associated with the data privacy vault 108 may dynamically update the interface 204 to present a sensitive information form window 210 through which the information security system 302 may provide to the member the sensitive information entry form 212. For example, as illustrated in FIG. 3B, the member, through the interface 204 has selected the previously provided link 120. In response to selection of the link 120, the task facilitation service 102 may redirect the member to the information security system 302, which may update the interface 204 to present the sensitive information form window 210 and the sensitive information entry form 212.

As noted above, the sensitive information entry form 212 may include a name field 214, through which the member may provide a name that may be associated with the provided sensitive information. In addition to the name field 214, the sensitive information entry form 212 may include a notes field 216 that may be used by the member to input the sensitive information that is to be stored in the sensitive information datastore 202. As noted above, the data privacy vault 108 may provide different forms for different categories or types of sensitive information that may be added to the data privacy vault 108. Thus, the notes field 216 may differ for different sensitive information categories or types and may include one or more input fields, accordingly. For example, the notes field 216 may include a single input field through which the member can enter both their username and password for a particular account. Alternatively, in some instances, the notes field 216 may include multiple input fields, which may be delineated according to the portion of sensitive information that may be provided. Thus, each form may be customized according to the corresponding sensitive information category or type.

In an embodiment, as the member provides their sensitive information using the provided sensitive information entry form 212, the representative 104 can transfer the corresponding task or project to a high-trust representative 106 that can obtain and use the sensitive information to perform one or more operations associated with the task or project. For example, through a representative console, the representative 104 may indicate that the task or project is ready for transfer to a high-trust representative 106. In response, the task facilitation service 102 may transfer the task or project to a high-trust representative 106 available to perform the one or more operations associated with the task or project for which the sensitive information may be required. For instance, the task facilitation service 102 may update the representative console associated with the high-trust representative 106 to indicate that the task or project has now been assigned to the high-trust representative 106. This may cause the high-trust representative 106 to access the user datastore 304 and the task datastore 306 to obtain any relevant information associated with the member and the particular task or project being performed, respectively.

In an embodiment, once the member has submitted the requested sensitive information through the provided sensitive information entry form 212, the information security system 302 may store this sensitive information in the sensitive information datastore 202. The sensitive information datastore 202 may store the provided sensitive information in association with the member and the particular category or type for the sensitive information. For example, for the provided username and password, the information security system 302 may associate this username and password with the "username-password" category and with the particular member within the sensitive information datastore 202. Additionally, the information security system 302 may automatically generate, for this sensitive information, a set of credentials or cryptographic token that may be used to access the sensitive information from the sensitive information datastore 202. This set of credentials or cryptographic token may be provided to the task facilitation service 102, which may store this set of credentials or cryptographic token in the user datastore 304 in associated with the member.

The task facilitation service 102 may restrict access to this set of credentials or cryptographic token to high-trust representatives and only when the corresponding sensitive information is required for a particular task or project. For example, when the representative 104 transfers a task or project to a high-trust representative 106, the representative 104 may indicate what sensitive information may be required for the task or project. For instance, if the representative 104 requested a form through which the member was to submit their account credentials for a particular brand, the representative 104 may indicate that these account credentials are required for the task or project. The task facilitation service 102, based on this indication from the representative 104 during the transfer of the task or project to the high-trust representative 106, may provide the set of credentials or cryptographic token associated with this sensitive information to the high-trust representative 106 through the user datastore 304. This may allow the high-trust representative 106 to retrieve the set of credentials or cryptographic token from the user datastore 304.

As noted above, in an embodiment, access to the sensitive information through use of the set of credentials or cryptographic token is subject to a timeout period, whereby when the timeout period elapses, the set of credentials or cryptographic token may be automatically expired and unusable to access the sensitive information. For example, when a task or project is transferred to the high-trust representative 106, the task facilitation service 102 may provide the high-trust representative 106 with an indication of the amount of time that the sensitive information may be made available to the high-trust representative 106 through the data privacy vault 108. Once this amount of time has elapsed, the set of credentials or cryptographic token usable to access the sensitive information may be automatically revoked, thereby preventing the high-trust representative 106 from accessing the sensitive information unless the high-trust representative 106 submits a request to the task facilitation service 102 to be granted renewed access to the sensitive information. Further, because the set of credentials or cryptographic token associated with the sensitive information is automatically revoked after a timeout period, access to the sensitive information may be time-limited, thereby reducing the likelihood of the sensitive information being accessed when the sensitive information is not required for performance of a task or project.

As illustrated in FIG. 3C, the high-trust representative 106 may use the provided set of credentials or cryptographic token to access the information security system 302 in order to obtain the required sensitive information. The information security system 302 may evaluate the provided set of credentials or cryptographic token to ensure that the set of credentials or cryptographic token is valid. If the set of credentials or cryptographic token is not valid (e.g., are expired, the high-trust representative 106 is not authorized to use the set of credentials or cryptographic token, etc.), the information security system 302 may reject the request to obtain the sensitive information. However, if the information security system 302 successfully validates the provided set of credentials or cryptographic token, the information security system 302 may retrieve the corresponding sensitive information from the sensitive information datastore 202 and may provide this sensitive information to the high-trust representative 106. Using this sensitive information, the high-trust representative 106 may perform any operations that require the sensitive information. For example, if the member's account credentials associated with a particular brand are required to complete a checkout process, the high-trust representative 106 may use these account credentials (as obtained from the data privacy vault 108) to complete the checkout process on behalf of the member. As another illustrative example, if the member's health insurance information is required to schedule an appointment on behalf of the member with a licensed physician, the high-trust representative 106 may obtain the member's health insurance information from the data privacy vault 108 in order to complete scheduling of this appointment for the member.

In an embodiment, when a task or project is transferred from a representative 104 to a high-trust representative 106, the task facilitation service 102 transfers the communications session 116 to the high-trust representative 106 to allow the high-trust representative 106 to communicate with the member directly with regard to the task or project. For example, as illustrated in FIG. 3C, the high-trust representative 106, beginning with message 308, may indicate that they have received the member's account information and that they have used this account information to complete the checkout process. The high-trust representative 106, through the communications session 116, may further provide the member with information regarding the status of the particular task or project, any requests for substitutions or clarifications related to the task or projects, any requests to provide any one-off codes for multi-factor authentication requests from a brand or other third-party service, and the like. For example, as illustrated in FIG. 3C, the high-trust representative 106 may indicate, for the particular task related to the purchase of one or more items, that these one or more items will be delivered in two to three days.

In some instances, when the high-trust representative 106 has completed performing the one or more operations requiring the provided sensitive information, the high-trust representative 106 may transfer the task or project back to the representative 104. Any sensitive information used by the high-trust representative 106 may be obfuscated from the representative console utilized by the representative 104 in order to prevent exposure of the sensitive information to the representative 104. The representative 104 may perform any remaining operations associated with the task or project on behalf of the member without having access to the sensitive information previously used by the high-trust representative 106. Further, the set of credentials or cryptographic token previously used to access the sensitive information may be automatically revoked such that the high-trust representative 106 may no longer have access to the sensitive information now that the particular operations have been performed.

Figure 4:
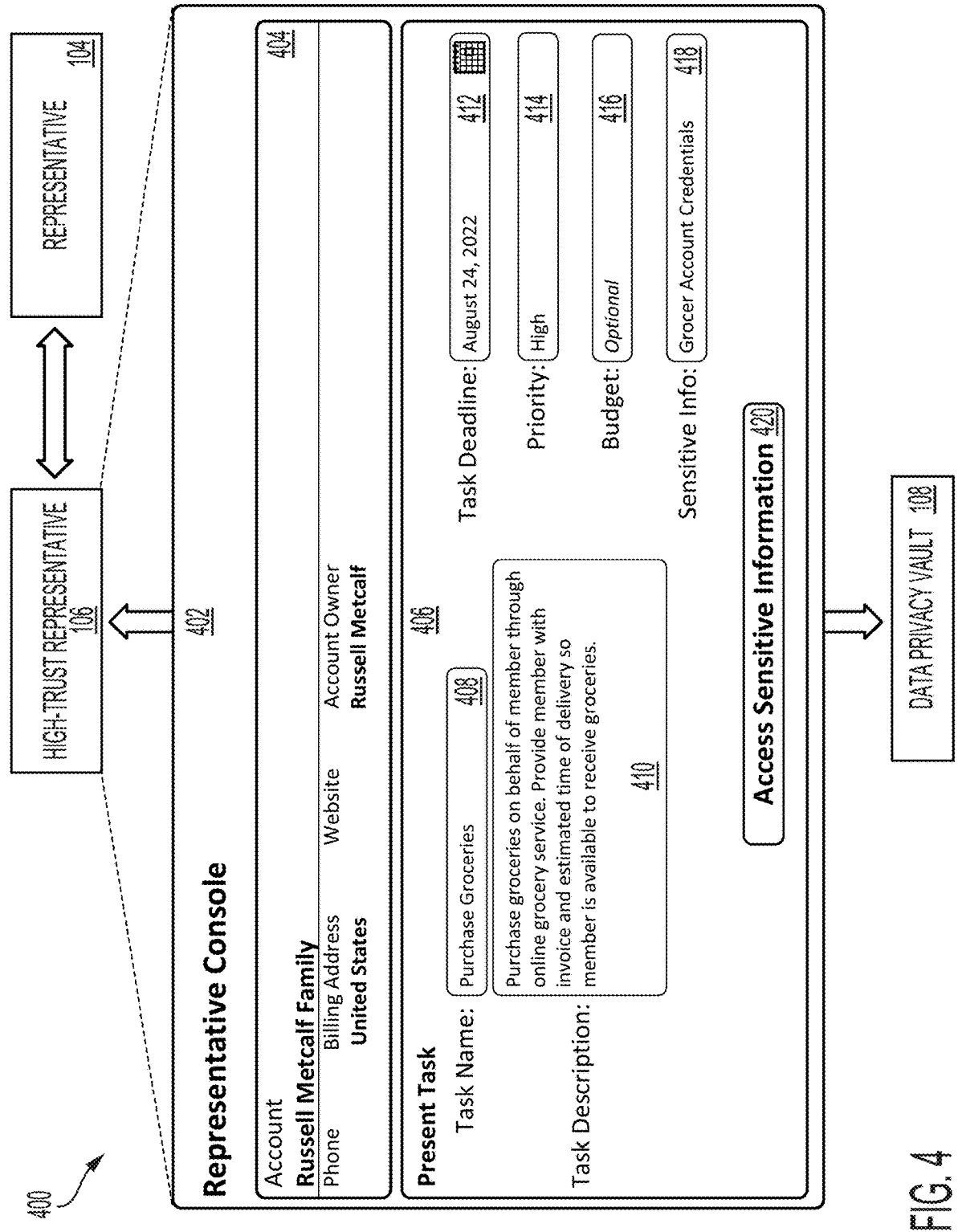
FIG. 4 shows an illustrative example of an environment in which a high-trust representative is assigned a task for which sensitive information is required for performance of the task in accordance with at least one embodiment.

FIG. 4 shows an illustrative example of an environment 400 in which a high-trust representative 106 is assigned a task for which sensitive information is required for performance of the task in accordance with at least one embodiment. As noted above, a representative 104 may transfer a task or project to a high-trust representative 106 for performance of one or more operations that require the use of sensitive information associated with a member (e.g., sensitive operations). When the representative 104 transfers the task or project to the high-trust representative 106, the representative 104 may indicate what sensitive information may be required to perform the one or more sensitive operations for completion of the task or project. For example, if the representative 104 determines that a member's account credentials associated with a particular grocer are required to complete a checkout process for a particular task or project, the representative 104 may indicate that these account credentials may be needed in order to complete the particular task or project.

In an embodiment, if the representative 104 requested a form through which the member was to submit their sensitive information for performance of one or more sensitive operations associated with a task or project, the representative 104 can indicate that this sensitive information is required for the task or project. As noted above, the task facilitation service, based on this indication from the representative 104 during the transfer of the task or project to the high-trust representative 106, may provide a set of credentials or cryptographic token associated with this sensitive information to the high-trust representative 106 through the user datastore. This may allow the high-trust representative 106 to retrieve the set of credentials or cryptographic token from the user datastore. In some instances, the set of credentials or cryptographic token may be automatically provided to the high-trust representative 106 when the task or project is transferred to the high-trust representative 106.

In the environment 400, the high-trust representative 106 may review the particular task or project transferred to them through a representative console 402 provided by the task facilitation service. As illustrated in FIG. 4, the task facilitation service may provide, through the representative console 402, an account window 404, through which the high-trust representative 106 may review account information associated with the member. For instance, the account window 404 may include an account name (e.g., unique label associated with the account as defined by the member, the representative 104, or by the task facilitation service based on characteristics of the account, etc.), a phone number associated with the account, a billing address or other address associated with the account, a website associated with the account, an account holder's name (e.g., the member or other entity that serves as the owner of the account), and the like. This information may be used to uniquely identify the account for the representative 104 and the high-trust representative 106.

The representative console 402 may further include a present task window 406 that may be implemented to present various parameters associated with the present task or project transferred to the high-trust representative 106 by the representative 104. For instance, as illustrated in FIG. 4, the present task window 406 may include a task name field 408, through which a name or title for the task or project may be presented. Additionally, the task facilitation service may provide, through the present task window 406, a task description field 410, which may include a short description of the task or project being performed on behalf of a member. For example, as illustrated in FIG. 4, the task description field 410 may be used to indicate that representatives are to purchase groceries on behalf of a member through an online grocery service and provide an invoice and estimated time for delivery of these groceries.

The task facilitation service may further provide, through the present task window 406, a task deadline field 412, through which a deadline for completion of the task or project is provided. The present task window 406 may further include a priority field 414, through which a priority may be assigned for the particular task or project. The priority for the particular task or project may be defined by the representative 104 based on their knowledge of the member and of the task or project being performed. For example, if the representative 104 determines, based on their knowledge of the member and of the task or project, that the member considers the particular project or task to be of utmost importance, the representative 104 may assign a high priority to the project or task. Conversely, if the representative 104 determines that the project or task is not an urgent one and is one that can be performed at any time without any negative impact to the member, the representative 104 may assign a lower priority to the project or task.

The present task window 406 may further include a budget field 416, through which a budget for completion of the task or project may be defined. For instance, the representative 104, based on its knowledge of the member and of the particular task or project, may define a budget for completion of the task or project via the budget field 416. In some instances, if the representative 104 knows that the member is not budget conscious with regard to performance of projects and tasks, the representative 104 may omit providing a budget via the budget field 416. Thus, the definition of a budget via the budget field 416 may be optional, as illustrated in FIG. 4.

In an embodiment, the present task window 406 further includes a sensitive information identifier field 418. As noted above, when a task or project is transferred to a high-trust representative 106 that is authorized to access sensitive information for the performance of one or more sensitive operations associated with the task or project, the high-trust representative 106 may be provided with an indication of the category or type of sensitive information submitted by the member through the form provided by the data privacy vault 108 in response to selection of a link provided to the member. Accordingly, through the sensitive information identifier field 418, the high-trust representative 106 may be provided with an indication corresponding to the category or type of the sensitive information that may be available to the high-trust representative 106 for performance of these sensitive operations. In some instances, the sensitive information identifier field 418 may include the name provided for the sensitive information (such as through the name field 214 described above in connection with FIG. 2C).

In an embodiment, the task facilitation service further provides, through the present task window 406, an access sensitive information button 420 that may be used by the high-trust representative 106 to obtain the needed sensitive information from the data privacy vault 108 for performance of the one or more sensitive operations. As noted above, access to the sensitive information may be provided on a "need to know" basis, whereby the high-trust representative 106 is granted access only to the sensitive information required for performance of the sensitive operations associated with the task or project transferred to the high-trust representative 106. Thus, the access sensitive information button 420 may be presented to the high-trust representative 106 only while the task or project requiring this sensitive information is assigned to the high-trust representative 106.

If the high-trust representative 106 selects the access sensitive information button 420, the task facilitation service may automatically provide a unique set of credentials or cryptographic token that may be used by the high-trust representative 106 to retrieve the required sensitive information from the data privacy vault 108 for the assigned task or project. For example, when the high-trust representative 106 selects the access sensitive information button 420, the task facilitation service, on behalf of the high-trust representative 106, may transmit a request to the data privacy vault 108 to retrieve the required sensitive information. This request may include the unique set of credentials or cryptographic token corresponding to the sensitive information. In response to this request, the data privacy vault 108 may process this set of credentials or cryptographic token to determine what sensitive information is available to the high-trust representative 106.

In an embodiment, if the high-trust representative 106 selects the access sensitive information button 420, the task facilitation service can redirect the high-trust representative 106 to the data privacy vault 108 while providing the set of credentials or cryptographic token associated with the required sensitive information to the data privacy vault 108 for authentication of the high-trust representative 106 and for identification of the sensitive information that may be available to the high-trust representative 106. Through the data privacy vault 108, the high-trust representative 106 may select the particular type or category for the sensitive information that is being retrieved. For example, if the high-trust representative 106 requires the member's account credentials for a particular brand, the high-trust representative 106 may select the type or category corresponding to brand-specific account credentials.

In some instances, if the high-trust representative 106 selects the access sensitive information button 420, the task facilitation service may provide the unique set of credentials or cryptographic token to the high-trust representative 106. In this instance, if the high-trust representative 106 selects a particular type or category, the data privacy vault 108 may prompt the high-trust representative 106 to provide their set of credentials or cryptographic token for accessing sensitive information from the data privacy vault 108. The data privacy vault 108 may evaluate this set of credentials or cryptographic token to determine whether the set of credentials are valid and, if so, whether the high-trust representative 106 is authorized to access sensitive information corresponding to the selected type or category. If the high-trust representative 106 attempts to access a type or category that is different from the type or category associated with the sensitive information that the high-trust representative 106 has been granted access to, the data privacy vault 108 may automatically deny the request to access the selected type or category.

As noted above, if the high-trust representative 106 selects the particular type or category associated with the sensitive information that the high-trust representative 106 has been granted access to, the data privacy vault 108 may present the available sensitive information to the high-trust representative 106. For example, the data privacy vault 108 may present the completed form submitted by the member for entry of this sensitive information. The completed form may include the plaintext representation of the sensitive information such that the high-trust representative 106 may be able to review the sensitive information. However, the sensitive information may not be made available to the representative 104, the member, or any other unauthorized entity. In some instances, the completed form or the sensitive information itself may be presented to the high-trust representative 106 through the representative console 402.

In an embodiment, the access sensitive information button 420 is provided for a limited period of time whereby after the limited period of time has elapsed, the access sensitive information button 420 may no longer be used to access the sensitive information. As noted above, when a task or project is transferred to the high-trust representative 106 for performance of one or more sensitive operations requiring access and use of sensitive information, the task facilitation service may provide the high-trust representative 106 with an indication of the amount of time that the sensitive information may be made available to the high-trust representative 106 through the data privacy vault 108. Once this amount of time has elapsed, the set of credentials or cryptographic token usable to access the sensitive information may be automatically revoked. Additionally, the task facilitation service may remove the access sensitive information button 420 from the representative console 402 or otherwise make the access sensitive information button 420 unavailable for use (e.g., graphically indicate the button 420 is unavailable, disable use of the button 420, etc.).

As noted above, once the high-trust representative 106 has completed performing the one or more sensitive operations requiring use of the sensitive information, the high-trust representative 106 may transfer the task or project to the representative 104. The representative 104, through their own representative console, may review the sensitive operations performed by the high-trust representative 106 for the particular task or project. However, any sensitive information used by the high-trust representative 106 may be obfuscated from the representative console utilized by the representative 104 or omitted from the representative console entirely in order to prevent exposure of the sensitive information to the representative 104. Further, the access sensitive information button 420 may be removed such that the representative console utilized by the representative 104 does not include the access sensitive information button 420. Thus, the representative 104 may perform any remaining operations associated with the task or project on behalf of the member without having access to the sensitive information previously used by the high-trust representative 106.

Figure 5:
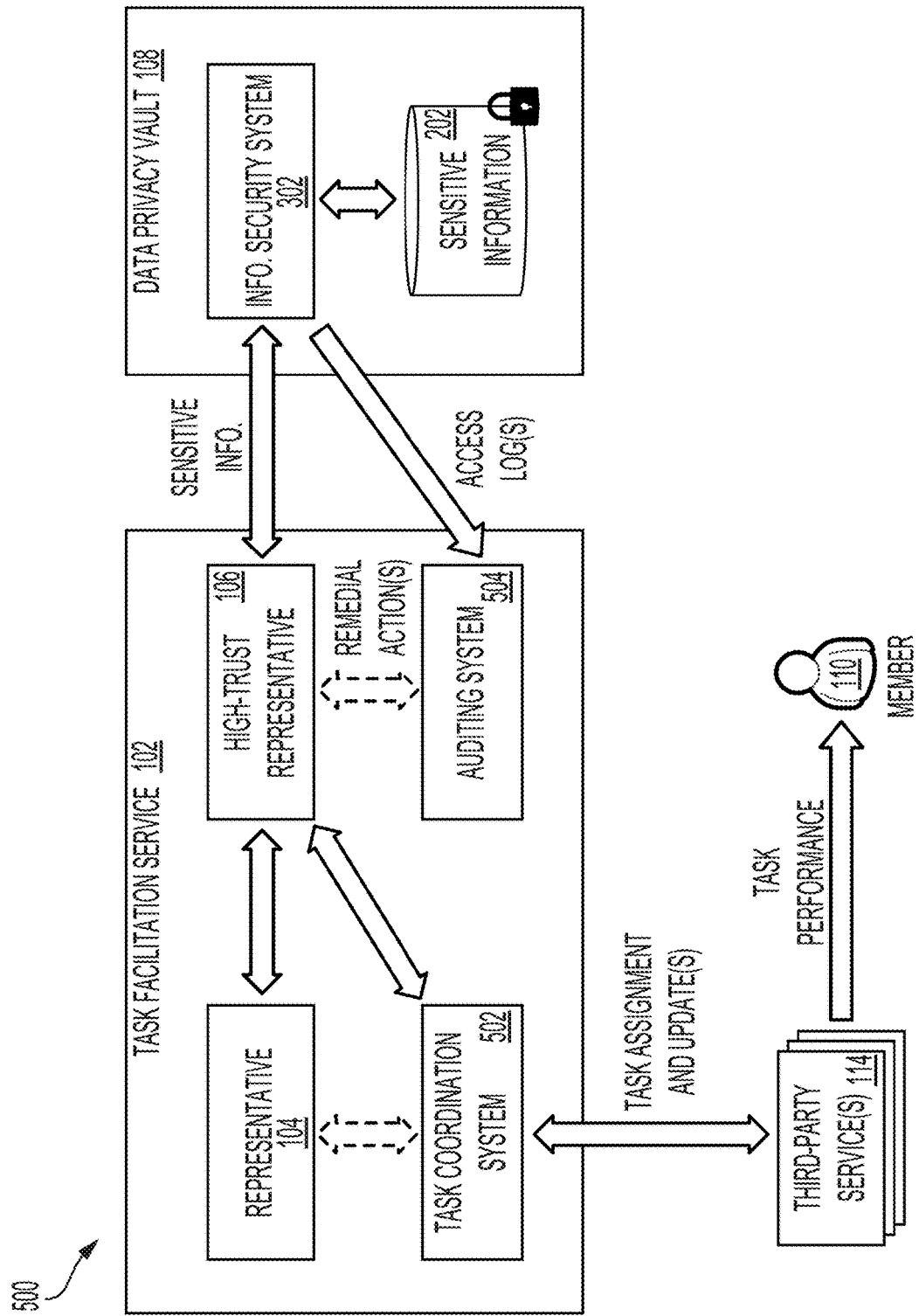
FIG. 5 shows an illustrative example of an environment in which a task facilitation service, through an auditing system, monitors access to sensitive information associated with a member to ensure that the sensitive information is being accessed by high-trust representatives for the performance of tasks in accordance with at least one embodiment.

FIG. 5 shows an illustrative example of an environment 500 in which a task facilitation service 102, through an auditing system 504, monitors access to sensitive information associated with a member 110 to ensure that the sensitive information is being accessed by high-trust representatives 106 for the performance of tasks in accordance with at least one embodiment. In the environment 500, a representative 104 may transfer a task or project to a high-trust representative 106 for performance of one or more sensitive operations requiring access to sensitive information provided by a member 110 and stored within a sensitive information datastore 202 of a data privacy vault 108. As noted above, the representative 104 may be prohibited from accessing any sensitive information associated with the member 110. Thus, the representative 104 may perform any other operations associated with the task or project and transfer the task or project to the high-trust representative 106 for performance of the sensitive operations associated with the task or project.

When the task or project is transferred from the representative 104 to the high-trust representative 106, the high-trust representative 106 may transmit a request to an information security system 302 implemented by the data privacy vault 108 to obtain sensitive information that may be used to perform one or more sensitive operations associated with a task or project being performed on behalf of a member 110. As noted above, the high-trust representative 106, through a representative console provided by the task facilitation service 102, may select an option to access sensitive information from the data privacy vault 108 for a particular task or project. Selection of this presented option may cause the task facilitation service 102 to redirect the high-trust representative 106 to the information security system 302 of the data privacy vault 108. The information security system 302 may provide the high-trust representative 106 with various types or categories of sensitive information that may be stored within the sensitive information datastore 202. From these presented types or categories of sensitive information, the high-trust representative 106 may select the particular type or category for the sensitive information that may be needed to perform the one or more sensitive operations.

If the high-trust representative 106 selects a particular sensitive information type or category, the information security system 302 may prompt the high-trust representative 106 to provide their set of credentials or cryptographic token (as issued by the task facilitation service 102) for accessing sensitive information from the sensitive information datastore 202. The information security system 302 may evaluate this set of credentials or cryptographic token to determine whether the set of credentials are valid and, if so, whether the high-trust representative 106 is authorized to access sensitive information corresponding to the selected type or category. The set of credentials or cryptographic token issued to the high-trust representative 106 may be specific to particular sensitive information associated with a specific type or category. If the high-trust representative 106 attempts to access a type or category that is different from the type or category associated with the sensitive information that the high-trust representative 106 has been granted access to, the information security system 302 may automatically deny the request to access the selected type or category.

If the high-trust representative 106 selects the particular type or category associated with the sensitive information that the high-trust representative 106 has been granted access to, the information security system 302 may retrieve the sensitive information from the sensitive information datastore 202. Further, the information security system 302 may present the available sensitive information to the high-trust representative 106. For example, the information security system 302 may present, through the representative console utilized by the high-trust representative 106, the completed form submitted by the member 110 for storage of the sensitive information. The completed form may include the plaintext representation of the sensitive information such that the high-trust representative 106 may be able to review the sensitive information. However, the sensitive information may not be made available to the representative 104, the member 110, or any other unauthorized entity.

In an embodiment, the information security system 302 automatically logs any attempt to access sensitive information from the data privacy vault 108. For instance, when the high-trust representative 106 submits a request to the information security system 302 to access particular sensitive information from the sensitive information datastore 202, the information security system 302 may automatically generate an entry within an access log to note the request. This entry may indicate any identifying information associated with the entity attempting to access sensitive information (e.g., a username or identifier corresponding to the high-trust representative 106 or representative 104, Internet Protocol (IP) address or other network address associated with the entity submitting the request, etc.), the category or type associated with the sensitive information being requested, a timestamp corresponding to the time at which the request was submitted, information corresponding to any credentials or cryptographic tokens provided, and an access decision (e.g., approved, denied, etc.). This access log may be updated in real-time as requests are received and processed by the information security system 302.

In an embodiment, the task facilitation service 102 includes an auditing system 504 that is implemented to obtain and process access logs from the information security system 302 in order to audit requests made to the information security system 302 to retrieve sensitive information from the sensitive information datastore 202. The auditing system 504 may be implemented using a computer system or application executed on a computer system associated with the task facilitation service 102. In some instances, the auditing system 504 may obtain the access logs maintained by the information security system 302 in real-time as requests to access sensitive information from the sensitive information datastore 202 are received and processed by the information security system 302. For example, the auditing system 504 may maintain a real-time data feed between the auditing system 504 and the information security system 302, whereby the access logs maintained by the information security system 302 may be streamed to the auditing system 504 in real-time.

In an embodiment, the auditing system 504 processes the obtained access logs in real-time as requests to access sensitive information are processed by the information security system 302 to determine whether any unauthorized attempts have been made to access sensitive information stored within the sensitive information datastore 202. For example, the auditing system 504 may process the access logs to identify any rejected requests to access sensitive information to determine why these requests were rejected. For instance, if a request to access sensitive information was rejected because the entity that submitted the request did not have the requisite set of credentials or cryptographic token for authentication and authorization of the entity, the auditing system 504 may determine whether the entity was actually authorized to access the requested sensitive information and, if so, why this entity did not have the requisite set of credentials or cryptographic token for accessing the sensitive information. As an illustrative example, if the auditing system 504 determines that a high-trust representative 106 has submitted a request to access sensitive information from the data privacy vault 108, and the request was rejected as a result of the high-trust representative 106 not having the requisite set of credentials or cryptographic token, the auditing system 504 may determine whether the set of credentials or cryptographic token were previously provided to the high-trust representative 106 and have expired as a result of the high-trust representative 106 no longer having a need to access the sensitive information. Further, the auditing system 504 may determine if an entity other than the high-trust representative 106 has hacked or otherwise gained unauthorized access to the account associated with the high-trust representative 106 (e.g., the IP address associated with the request does not correspond to the known IP address for the high-trust representative 106, etc.). As another illustrative example, if the auditing system 504 determines that a representative 104 has submitted a request to access sensitive information from the data privacy vault 108, the auditing system 504 may automatically determine that such a request should not have been made by the representative 104, as the representative 104 is not authorized to access sensitive information associated with members of the task facilitation service 102 at any time.

In addition to evaluating rejected requests made to the information security system 302 to access sensitive information, the auditing system 504 may evaluate any approved requests to ensure that these requests were made by authorized entities and only for active tasks or projects requiring use of this sensitive information. For example, the auditing system 504 may determine whether the information security system 302 has granted access to sensitive information from the sensitive information datastore 202 to a high-trust representative 106 using an expired set of credentials or cryptographic token. As another example, the auditing system 504 may determine whether the information security system 302 has granted access to sensitive information to a representative 104 that is not authorized to access any sensitive information from the data privacy vault 108 (e.g., the representative 104 has accessed the sensitive information without the required set of credentials or cryptographic token, the representative 104 has gained access to the set of credentials or cryptographic token associated with the sensitive information, etc.). As yet another illustrative example, the auditing system 504 may determine whether an entity granted access to sensitive information is a high-trust representative 106, such as through evaluation of the IP address or network address associated with the entity.

In an embodiment, based on this real-time evaluation of the access logs maintained by the information security system 302, the auditing system 504 may determine whether one or more remedial actions are required to address any unauthorized access or attempts to access sensitive information from the data privacy vault 108. For instance, if a high-trust representative 106 has attempted to access sensitive information not related to a particular task or project that is currently assigned to the high-trust representative 106, the auditing system 504 may suspend the high-trust representative 106, thereby prohibiting the high-trust representative 106 from being able to access the data privacy vault 108 to access sensitive information. Additionally, or alternatively, the auditing system 504 may require the high-trust representative 106 to undergo remedial training to ensure that the high-trust representative 106 is informed of the appropriate time(s) for accessing sensitive information for the performance of sensitive operations associated with tasks and/or projects. As another illustrative example, if a representative 104 has gained access, or has attempted to gain access, to sensitive information associated with a member 110, the auditing system 504 may suspend the representative 104 such that the representative 104 is no longer assigned to the member 110 or any other members for a period of time. Any members assigned to the representative 104 may be assigned with alternative representatives permanently or over the period of time corresponding to the suspension of the representative 104.

In an embodiment, a representative 104 or high-trust representative 106 can coordinate with one or more third-party services 114 for performance of a task or project through a task coordination system 502 implemented by the task facilitation service 102. The task coordination system 502 may be implemented using a computer system or as an application or other executable code implemented on a computer system of the task facilitation service 102. The task coordination system 502 may be used to identify one or more third-party services 114 and/or resources (e.g., retailers, restaurants, websites, brands, types of goods, particular goods, etc.) that may be used for performance of the task or project for the benefit of the member 110. The task coordination system 502 may be used by a representative 104 and/or high-trust representative 106 to further contact one or more third-party services 114 for performance of a task or project.

The task coordination system 502 may monitor performance of the task or project by these third-party services 114. For instance, the task coordination system 502 may record any information provided by the third-party services 114 with regard to the timeframe for performance of the task or project, the cost associated with performance of the task or project, any status updates with regard to performance of the task or project, and the like. Status updates provided by third-party services 114 may be provided automatically to the member 110 via an interface (e.g., such as interface 204 described above in connection with FIGS. 2A-2C) provided by the task facilitation service 102. Additionally, or alternatively, these status updates may be provided automatically to the representative 104 and/or the high-trust representative 106 via a representative console.

In an embodiment, if one or more sensitive operations are to be performed for a task or project, the high-trust representative 106 can communicate with a third-party service 114 to coordinate performance of these one or more sensitive operations without exposing sensitive information to the task coordination system 502 or the representative 104. For example, if the high-trust representative 106 is tasked with using a member's account credentials associated with an online retailer (e.g., third-party service 114) to complete a checkout process on behalf of the member 110, the high-trust representative 106 may access the third-party service 114 directly to provide these account credentials to the online retailer for authentication and for completing the checkout process. Once the account credentials have been authenticated, the task coordination system 502 may monitor the interactions amongst the high-trust representative 106, the online retailer (e.g., third-party service 114), and the member 110 to ensure that the task or project is being completed according to the defined parameters for the task or project.

Figure 6:
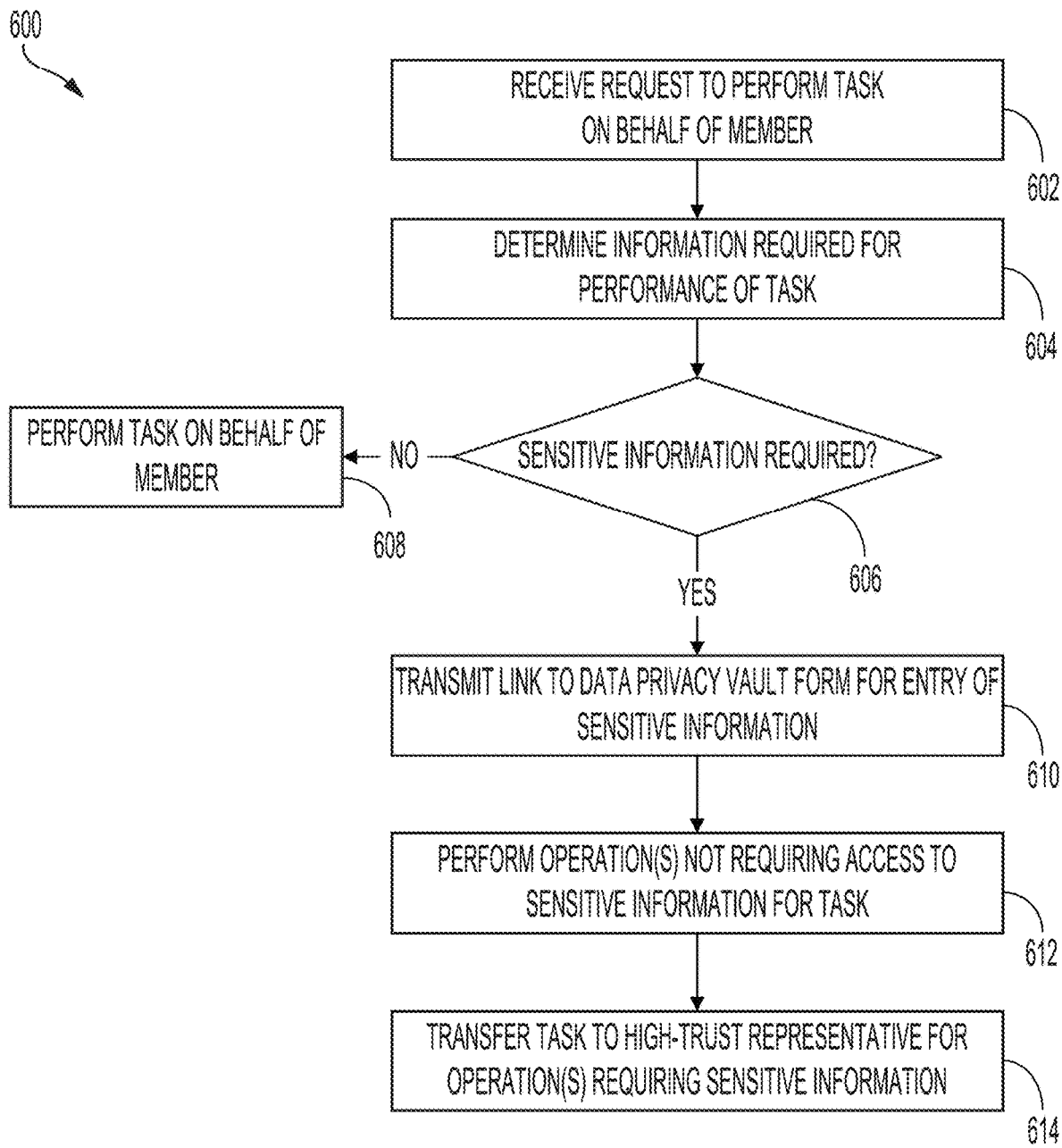
FIG. 6 shows an illustrative example of a process for performing one or more operations associated with a task and transferring the task to a high-trust representative when sensitive information is required for completion of the task in accordance with at least one embodiment.

FIG. 6 shows an illustrative example of a process 600 for performing one or more operations associated with a task and transferring the task to a high-trust representative when sensitive information is required for completion of the task in accordance with at least one embodiment. The process 600 may be performed by a representative assigned to a member for the performance of one or more tasks or projects on behalf of the member. As noted above, the representative may not be authorized to access sensitive information associated with a member in order to mitigate the risk of such sensitive information being exposed (inadvertently or intentionally) to unauthorized entities, including any entities not associated with the task facilitation service.

At step 602, the representative may receive a request to perform a task or project on behalf of a member. The representative may be assigned to the member through an onboarding process, as described above. For instance, the task facilitation service may use identifying information of a member, as well as any information related to the member's level of comfort or interest in delegating tasks to others, and any other information obtained during the onboarding process to identify a representative that may be well-suited to interact and communicate with the member in a productive manner. The request to perform the task or project on behalf of the member may be provided over a communications session facilitated by the task facilitation service between the member and the representative. As an illustrative example, through this communications session, the member may indicate that they would like the representative's assistance with their weekly meal planning, including purchasing groceries that can be delivered to the member for their meal plan.

In some instances, the representative may generate a new project or task on behalf of the member based on their communications with the member over the aforementioned communications session. For instance, the representative may submit a request to the task facilitation service to generate a new project or task. In response to the request, the task facilitation service may identify one or more templates that may be used by the representative to define the new project or task. The one or more task templates may correspond to the task type or category for the projects and/or tasks being defined. Returning to the example described above, if the member has specified, via the communications session, that the member requires assistance with purchasing a set of items from a particular online retailer for delivery to the member's home, the representative may select a template corresponding to online purchases. Through this template, the representative may define one or more operations that may be performed in order to complete the project or task.

At step 604, the representative may determine what information may be required for performance of the task. For instance, the representative may evaluate the one or more operations associated with the particular task or project to determine, at step 606, whether sensitive information associated with the member is required for completion of the task. Returning to the previous illustrative example related to the member's weekly meal planning, the representative may determine that, in order for the items on the shopping list to be purchased from an online retailer, the member may be required to provide their account credentials associated with the online retailer. In some instances, the representative may determine that the member may be required to provide payment information, such as a payment card number, a CVV associated with the payment card, the expiration date associated with the payment card, and the like. As another illustrative example, if the representative has defined a task related to the scheduling of a medical procedure, the representative may determine that, in order for the medical procedure to be scheduled, the member may be required to provide their medical insurance information. As noted above, such information may be deemed to be sensitive in nature, whereby inadvertent or purposeful dissemination and exposure of such information to unauthorized entities may produce harm to the member. Accordingly, the task facilitation service may prohibit the representative from accessing such sensitive information.

If the representative determines that no sensitive information is required for performance of the task or project, the representative, at step 608, may perform the task or project on behalf of the member. As no sensitive information is required for the task or project, the member may perform this task or project without need to transfer the task or project to a high-trust representative.

If the representative determines that sensitive information is required to complete the particular task or project, the representative, at step 610, may transmit a link to a data privacy vault form to the member for entry of the required sensitive information. As noted above, the data privacy vault may provide various access controls in order to facilitate access to the sensitive information only to users that are authorized to access such sensitive information. These access controls may be defined by the task facilitation service, which may provide or generate a set of credentials for different users that may be authorized by the task facilitation service to access sensitive information stored in the data privacy vault. To generate the link, the representative may access the data privacy vault and select a particular type or category for the sensitive information that is required from the member. When the representative selects a particular category, the data privacy vault may present the representative with a form associated with the particular category, through which the representative may provide a description or name for the sensitive information that is to be provided. Once the representative has defined the name or description for the sensitive information that is to be provided by the member, the data privacy vault may provide a link to the corresponding form to the member for entry of the sensitive information. The representative may subsequently provide the link to the member through the communications session between the member and the representative.

At step 612, the representative may perform any operations associated with the task or project that do not require the use of the requested sensitive information. Returning to the example task related to the development of a weekly meal plan, including purchasing groceries that can be delivered to the member for their meal plan, the representative may develop one or more recipes that may be incorporated into the meal plan, prepare a grocery list for any meal items required for these recipes, and access an online retailer on behalf of the member to add these meal items to a virtual cart. At this point, completion of the task or project may require the use of sensitive information (e.g., username and password, payment information, etc.) to complete a checkout process with the online retailer. Accordingly, the representative may determine that they can no longer perform any further operations associated with the task or project until these sensitive operations are performed by a high-trust representative. Thus, at step 614, the representative may transfer the task or project to a high-trust representative for performance of any sensitive operations that require access and use of sensitive information associated with the member.

In some instances, the representative may await an indication from the data privacy vault that the member has provided the requested sensitive information before transferring the task or project to a high-trust representative. For instance, when the member executes the provided link to access the sensitive information form from the data privacy vault, the data privacy vault may monitor member interaction with the form to determine whether the member has submitted the requested sensitive information. For example, the data privacy vault may determine whether the member has submitted a request to submit the completed form for storage of the sensitive information within the data privacy vault. Once the sensitive information has been successfully stored within the data privacy vault, the data privacy vault may transmit a notification to the representative to indicate that the sensitive information has been submitted. In response to this notification, and upon completion of any other operations associated with the task or project that do not require access to this sensitive information, the representative may transfer the task or project to a high-trust representative.

Figure 7:
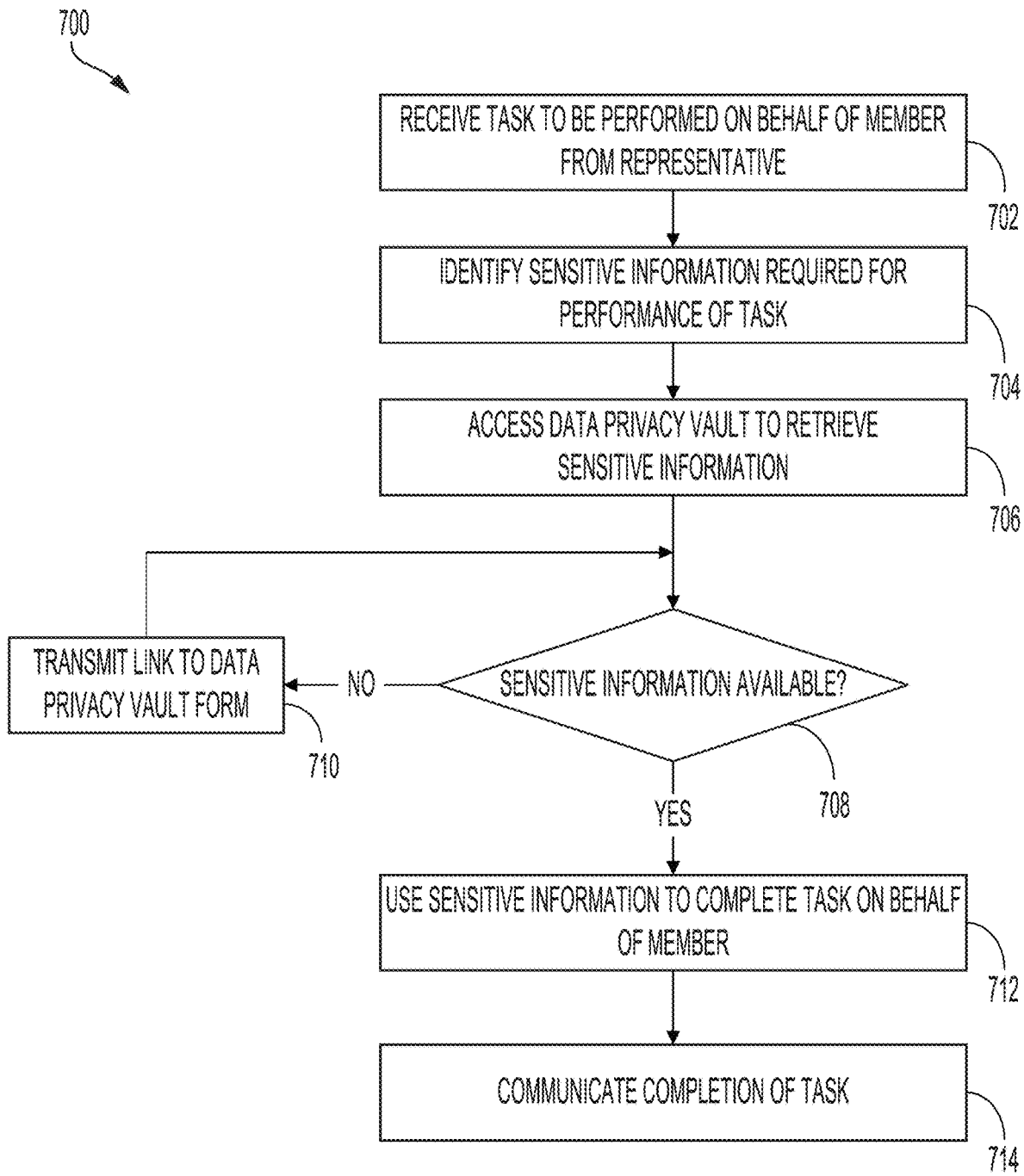
FIG. 7 shows an illustrative example of a process for accessing sensitive information associated with a member for the performance of a task in accordance with at least one embodiment.

FIG. 7 shows an illustrative example of a process 700 for accessing sensitive information associated with a member for the performance of a task in accordance with at least one embodiment. The process 700 may be performed by a high-trust representative that is authorized to access particular sensitive information associated with a member in order to perform one or more sensitive operations corresponding to a task or project being performed on behalf of the member. Further, the process 700 may be performed once a representative has transferred the task or project to the high-trust representative for performance of these one or more sensitive operations.

At step 702, the high-trust representative may receive, from a representative originally assigned to the member, a task or project that is to be performed on behalf of a member. As noted above, the representative originally assigned to the member may transfer a communications session facilitated between the member and the representative to the high-trust representative. Through this communications session, the high-trust representative may be able to review all previously exchanged communications between the member and the representative for the particular task or project, including the request provided to the member to provide their sensitive information. In some instances, through a representative console, the high-trust representative may review what operations have been performed on behalf of the member for the particular task or project.

At step 704, the high-trust representative may identify the sensitive information that may be required for performance of one or more sensitive operations associated with the task or project. For example, through a representative console provided to the high-trust representative by the task facilitation service, the high-trust representative may identify the category or type of sensitive information submitted by the member through use of the provided link or other access through the data privacy vault. The high-trust representative, for example, may evaluate the previously provided link to determine what category or type of sensitive information was requested by the representative for use in completing the task or project. Referring to FIG. 3A, the link provided to the member through the communications session may include a descriptor (e.g., "Account Credentials") corresponding to the category or type of sensitive information being requested. In some instances, the task facilitation service, through the representative console utilized by the high-trust representative, may indicate the category or type of sensitive information that has been stored in the data privacy vault for the particular task or project.

At step 706, the representative may access the data privacy vault to retrieve the required sensitive information for performance of the one or more sensitive operations associated with the task or project. For example, the high-trust representative, through the representative console, may select an option to access sensitive information from the data privacy vault for a particular task or project. Selection of this presented option may cause the task facilitation service to redirect the high-trust representative to the data privacy vault. The data privacy vault may provide the high-trust representative with various types or categories of sensitive information that may be stored within the sensitive information datastore. From these presented types or categories of sensitive information, the high-trust representative may select the particular type or category for the sensitive information that may be needed to perform the one or more sensitive operations.

As noted above, in response to the high-trust representative's selection of a particular type of category for the sensitive information, the data privacy vault may prompt the high-trust representative to provide their set of credentials or cryptographic token (as issued by the task facilitation service) for accessing sensitive information from the sensitive information datastore. The data privacy vault may evaluate this set of credentials or cryptographic token to determine whether the set of credentials are valid and, if so, whether the high-trust representative is authorized to access sensitive information corresponding to the selected type or category. The set of credentials or cryptographic token issued to the high-trust representative may be specific to particular sensitive information associated with a specific type or category. In some instances, the set of credentials or cryptographic token may be subject to an expiration, whereby if an expiration time has elapsed, the set of credentials or cryptographic token may be automatically revoked. Thus, while the high-trust representative may be authorized to access this sensitive information, if the set of credentials or cryptographic token are expired or are otherwise unavailable to the high-trust representative, the request to access the sensitive information may be automatically rejected by the data privacy vault.

Based on their interaction with the data privacy vault, the high-trust representative, at step 708, may determine whether the required sensitive information is available to the high-trust representative for use in performing the one or more sensitive operations. For example, if the set of credentials or cryptographic token required to access the sensitive information is unavailable to the high-trust representative, the high-trust representative may determine that the required sensitive information is not available to the high-trust representative. As another illustrative example, if the high-trust representative determines that the data privacy vault has no record of the requested sensitive information for the member, the high-trust representative may determine that they are unable to retrieve the required sensitive information from the data privacy vault. Accordingly, at step 710, the high-trust representative may transmit a link to the member (such as through the communications session between the member and the high-trust representative) to a data privacy vault form through which the member may provide the required sensitive information. Creation and presentation of this link may be similar to step 610 described above in connection with FIG. 6.

If the high-trust representative is able to obtain the required sensitive information from the data privacy vault, the high-trust representative, at step 712, may use the sensitive information to complete the task or project (e.g., any sensitive operations associated with the task or project) on behalf of the member. For instance, the high-trust representative may coordinate with one or more third-party services for performance of a task or project through a task coordination system implemented by the task facilitation service. In an embodiment, the high-trust representative can communicate with a third-party service to coordinate performance of the one or more sensitive operations associated with the task or project without exposing sensitive information to the task coordination system or the representative. For example, if the high-trust representative is tasked with using a member's account credentials associated with an online retailer to complete a checkout process on behalf of the member, the high-trust representative may access the online retailer directly to provide these account credentials to the online retailer for authentication and for completion of the checkout process. Once the account credentials have been authenticated, the task coordination system may monitor the interactions amongst the high-trust representative, the online retailer, and the member to ensure that the task or project is being completed according to the defined parameters for the task or project.

Once the sensitive operations associated with the task or project have been completed, the high-trust representative, at step 714, may communicate completion of the task or project (or the sensitive operations) to the member. For instance, through the communications session between the member and the high-trust representative, the high-trust representative may indicate that they have received the member's sensitive information and that they have used this sensitive information to complete the sensitive operations or the task/project. The high-trust representative, through the communications session, may further provide the member with information regarding the status of the particular task or project, any requests for substitutions or clarifications related to the task or projects, any requests to provide any one-off codes for multi-factor authentication requests from a brand or other third-party service, and the like.

As noted above, when the high-trust representative has completed performing the one or more sensitive operations requiring the provided sensitive information, the high-trust representative may transfer the task or project back to the representative. Any sensitive information used by the high-trust representative may be obfuscated from the representative console utilized by the representative in order to prevent exposure of the sensitive information to the representative. The representative may perform any remaining operations associated with the task or project (if any) on behalf of the member without having access to the sensitive information previously used by the high-trust representative. Further, the set of credentials or cryptographic token previously used to access the sensitive information may be automatically revoked such that the high-trust representative may no longer have access to the sensitive information now that the particular operations have been performed.

Figure 8:
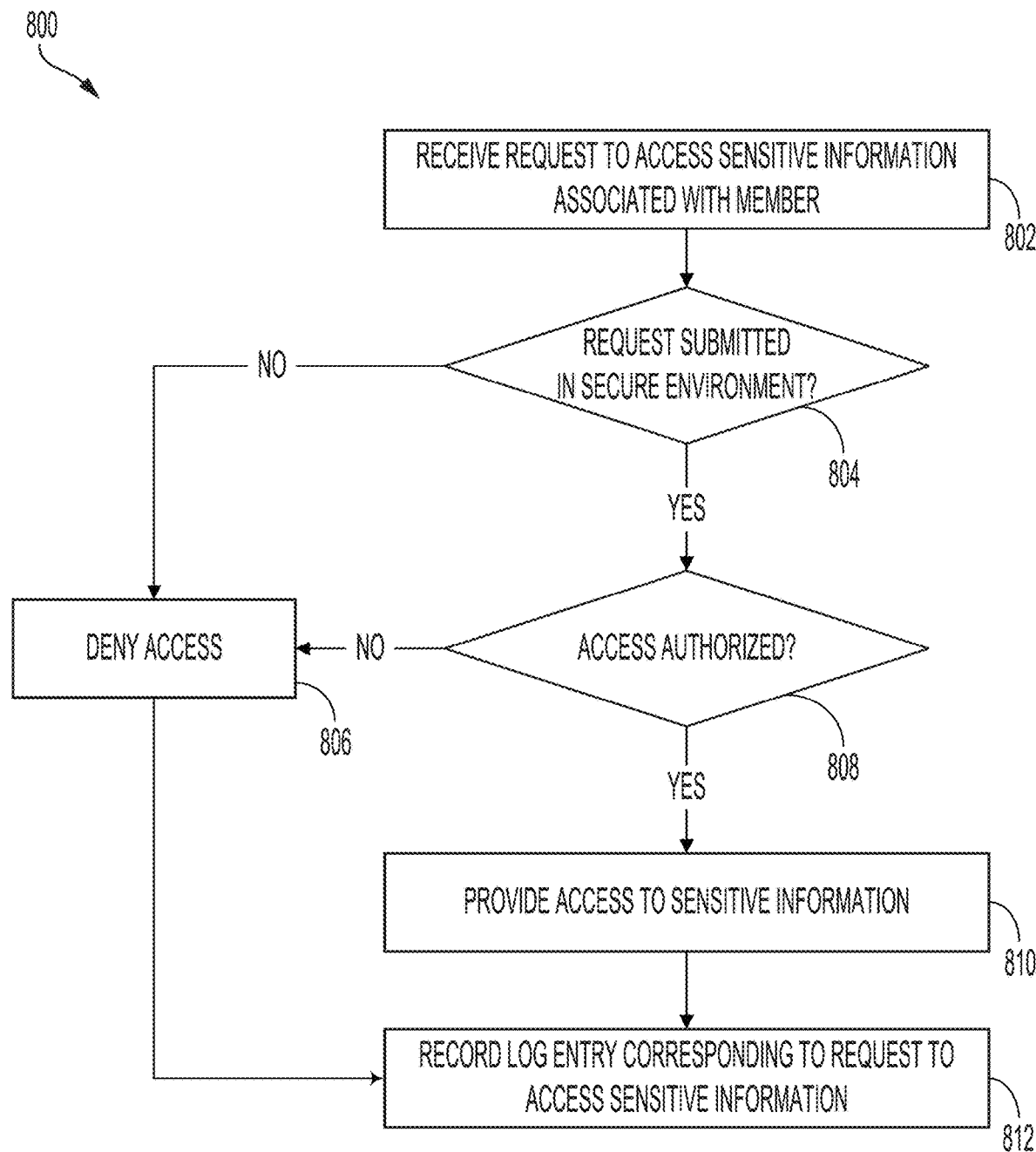
FIG. 8 shows an illustrative example of a process for controlling access to sensitive information associated with a member in accordance with at least one embodiment.

FIG. 8 shows an illustrative example of a process 800 for controlling access to sensitive information associated with a member in accordance with at least one embodiment. The process 800 may be performed by an information security system associated with a data privacy vault. The information security system may be implemented to manage access to sensitive information stored within a sensitive information datastore of the data privacy vault.

At step 802, the information security system may receive a request to access sensitive information associated with a particular member of the task facilitation service. As noted above, a high-trust representative, upon receiving a task or project requiring the use of sensitive information for completion, may transmit a request to the information security system to obtain sensitive information that may be used to perform one or more sensitive operations associated with a task or project being performed on behalf of a member. For instance, the high-trust representative, through a provided representative console, may select an option to access sensitive information from the data privacy vault for a particular task or project. Selection of this presented option may result in the high-trust representative being redirected to the information security system. The information security system may provide the high-trust representative with various types or categories of sensitive information that may be stored within the sensitive information datastore. From these presented types or categories of sensitive information, the high-trust representative may select the particular type or category for the required sensitive information in order to request access to the required sensitive information.

At step 804, the information security system may determine whether the request to access the sensitive information was submitted from a secure environment. For instance, access to the data privacy vault by a high-trust representative may be facilitated only through a secure computing environment (e.g., a computing environment with controlled storage and network access, a cryptographically secure environment, an isolated network environment, etc.). The information security system may evaluate the network connection between the high-trust representative and the data privacy vault to ensure that the network connection is secure (e.g., the network connection is encrypted, the network connection was established using one or more cryptographic methods or other authenticated methods, etc.). If the information security system determines that the request for sensitive information associated with a member was not submitted through a secure or trusted environment, the information security system may automatically, at step 806, deny access to the requested sensitive information. For instance, the information security system may transmit a notification to the high-trust representative to indicate that their request has been denied. Additionally, or alternatively, the information security system may terminate the network connection between the high-trust representative and the data privacy vault.

If the information security system determines that the request for sensitive information was submitted through a secure network environment, the information security system, at step 808, may determine whether access to the requested sensitive information is authorized. For instance, in response to a selection of a particular category or type of sensitive information, the information security system may prompt the high-trust representative to provide their set of credentials or cryptographic token (as issued by the task facilitation service) for accessing sensitive information from the data privacy vault. The information security system may evaluate this set of credentials or cryptographic token to determine whether the set of credentials are valid and, if so, whether the high-trust representative is authorized to access sensitive information corresponding to the selected type or category. As noted above, the set of credentials or cryptographic token issued to the high-trust representative may be specific to particular sensitive information associated with a specific type or category. Thus, if the high-trust representative attempts to access a type or category that is different from the type or category associated with the sensitive information that the high-trust representative has been granted access to and/or the provided set of credentials or cryptographic token is invalid, the information security system, at step 806, may automatically deny the request to access the selected type or category.

In an embodiment, if the information security system determines that the high-trust representative is authorized to access the requested sensitive information, the information security system, at step 810, can provide the high-trust representative with access to the sensitive information. For example, the information security system may retrieve the sensitive information from the data privacy vault and present the available sensitive information to the high-trust representative. For example, the information security system may present, through the representative console utilized by the high-trust representative, the completed form submitted by the member for storage of the sensitive information. The completed form may include the plaintext representation of the sensitive information such that the high-trust representative may be able to review the sensitive information. In some instances, if access to the sensitive information is provided for a limited period of time, the information security system may provide access to the sensitive information for only this limited period of time, after which access to the sensitive information may be automatically revoked.

At step 812, the information security system, regardless of whether access to the sensitive information was granted or denied, may record a log entry corresponding to the submitted request to access the sensitive information. For example, the information security system may automatically log any attempt to access sensitive information from the data privacy vault. For instance, the information security system may automatically generate an entry within an access log that indicates any identifying information associated with the entity attempting to access sensitive information (e.g., a username or identifier corresponding to the high-trust representative or other representative, IP address or other network address associated with the entity submitting the request, etc.), the category or type associated with the sensitive information being requested, a timestamp corresponding to the time at which the request was submitted, information corresponding to any credentials or cryptographic tokens provided, and an access decision (e.g., approved, denied, etc.). This access log may be updated in real-time as requests are received and processed by the information security system. Further, the access log may be used by the task facilitation service to automatically audit any requests made to the information security system to retrieve sensitive information associated with members of the task facilitation service.

Figure 9:
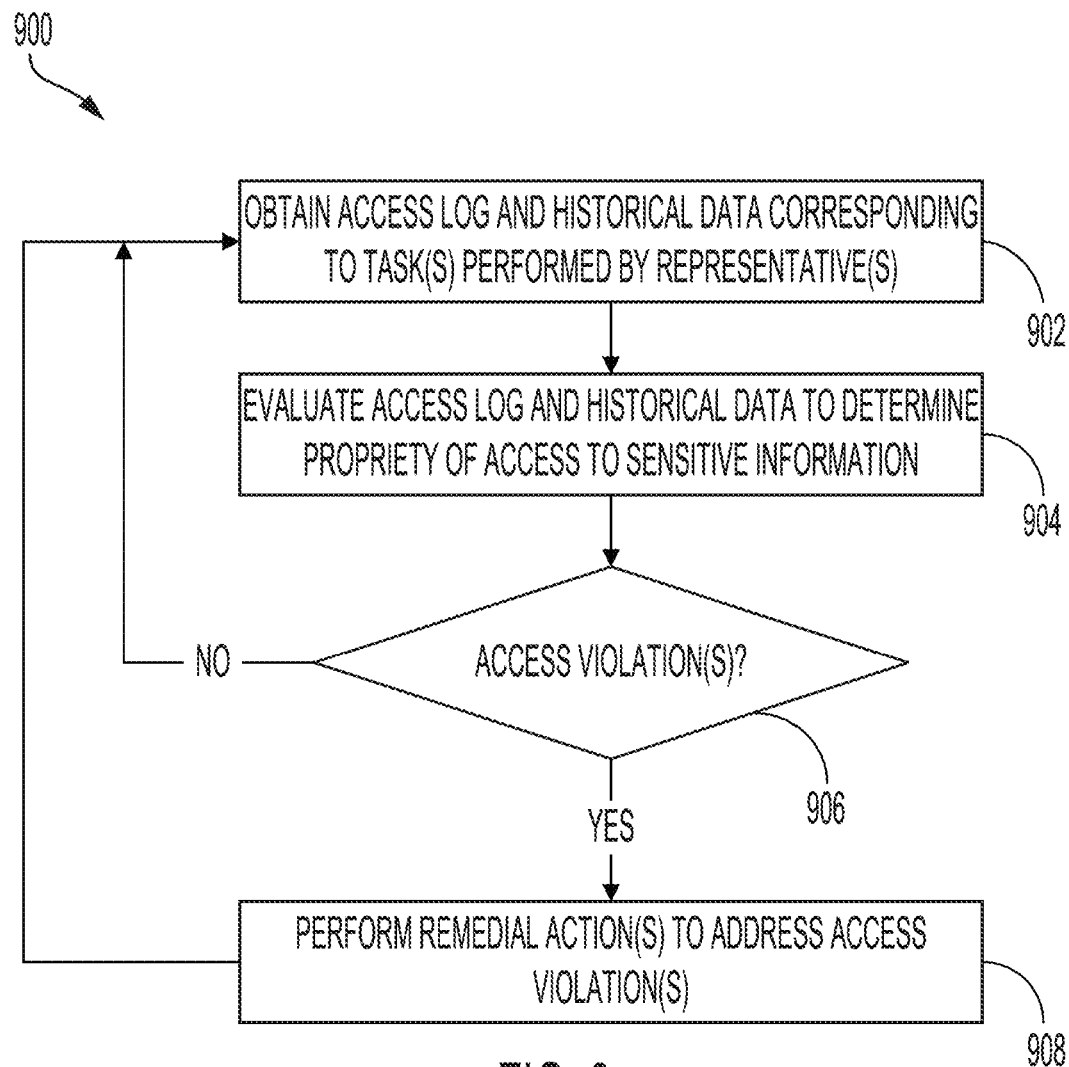
FIG. 9 shows an illustrative example of a process for auditing historical access to sensitive information associated with members of a task facilitation service to identify any access violations and to perform any required remedial actions in accordance with at least one embodiment.

FIG. 9 shows an illustrative example of a process 900 for auditing historical access to sensitive information associated with members of a task facilitation service to identify any access violations and to perform any required remedial actions in accordance with at least one embodiment. The process 900 may be performed by an auditing system implemented by the task facilitation service. As noted above, the auditing system may be implemented to automatically process access logs maintained by the data privacy vault in order to identify any unauthorized attempts to access sensitive information associated with members of the task facilitation service and to perform any remedial actions required to address such unauthorized attempts.

At step 902, the auditing system may obtain an access log and historical data corresponding to tasks and projects performed by various representatives and high-trust representatives. The auditing system, in an embodiment, obtains the access log and historical data in real-time as requests to access sensitive information from the data privacy vault are received and processed by the information security system. As noted above, the auditing system may maintain a real-time data feed between the auditing system and the information security system, whereby the access log and historical data maintained by the information security system may be streamed to the auditing system in real-time.

At step 904, the auditing system may evaluate the access log and historical data to determine the propriety of requests to access sensitive information from the data privacy vault. For instance, the auditing system may process the access log to identify any rejected requests to access sensitive information to determine why these requests were rejected. For instance, if a request to access sensitive information was rejected because the entity that submitted the request did not have the requisite set of credentials or cryptographic token for authentication and authorization of the entity, the auditing system may determine whether the entity was actually authorized to access the requested sensitive information and, if so, why this entity did not have the requisite set of credentials or cryptographic token for accessing the sensitive information. In addition to evaluating rejected requests made to the information security system to access sensitive information, the auditing system may evaluate any approved requests to ensure that these requests were made by authorized entities and only for active tasks or projects requiring use of this sensitive information.

Based on this evaluation of approved and rejected requests to access sensitive information, the auditing system may determine, at step 906, whether there are any access violations requiring performance of one or more remedial actions to address. For example, if the auditing system determines that a high-trust representative has submitted a request to access sensitive information from the data privacy vault, and the request was rejected as a result of the high-trust representative not having the requisite set of credentials or cryptographic token, the auditing system may determine whether the set of credentials or cryptographic token were previously provided to the high-trust representative and have expired as a result of the high-trust representative no longer having a need to access the sensitive information. Further, the auditing system may determine if an entity other than the high-trust representative has hacked or otherwise gained unauthorized access to the account associated with the high-trust representative. As another illustrative example, if the auditing system determines that a representative has submitted a request to access sensitive information from the data privacy vault, the auditing system may automatically determine that such a request should not have been made by the representative. The auditing system may further determine, for example, whether the information security system has granted access to sensitive information to a high-trust representative using an expired set of credentials or cryptographic token. As another example, the auditing system may determine whether the information security system has granted access to sensitive information to a representative that is not authorized to access any sensitive information from the data privacy vault. As yet another illustrative example, the auditing system may determine whether an entity granted access to sensitive information is a high-trust representative, such as through evaluation of the IP address or network address associated with the entity.

If the auditing system determines that no access violations have occurred, the auditing system may continue to obtain access logs and historical data from the information security system of the data privacy vault to audit requests made to the information security system for sensitive data in real-time, thus restarting the process 900. However, if the auditing system determines that one or more access violations have occurred, the auditing system, at step 908, may perform one or more remedial actions to address these access violations. For example, if a high-trust representative has attempted to access sensitive information not related to a particular task or project that is currently assigned to the high-trust representative, the auditing system may suspend the high-trust representative to prohibit the high-trust representative from being able to access the data privacy vault to access sensitive information. Additionally, or alternatively, the auditing system may require the high-trust representative to undergo remedial training to ensure that the high-trust representative is informed of the appropriate time(s) for accessing sensitive information for the performance of sensitive operations associated with tasks and/or projects. As another illustrative example, if a representative has gained access, or has attempted to gain access, to sensitive information associated with a member, the auditing system may suspend the representative such that the representative is no longer assigned to the member or any other members for a period of time. Any members assigned to the representative may be assigned with alternative representatives permanently or over the period of time corresponding to the suspension of the representative. Once these remedial actions have been performed, the auditing system may continue to obtain access logs and historical data from the information security system of the data privacy vault to audit requests made to the information security system for sensitive data in real-time, thus restarting the process 900.

Figure 10:
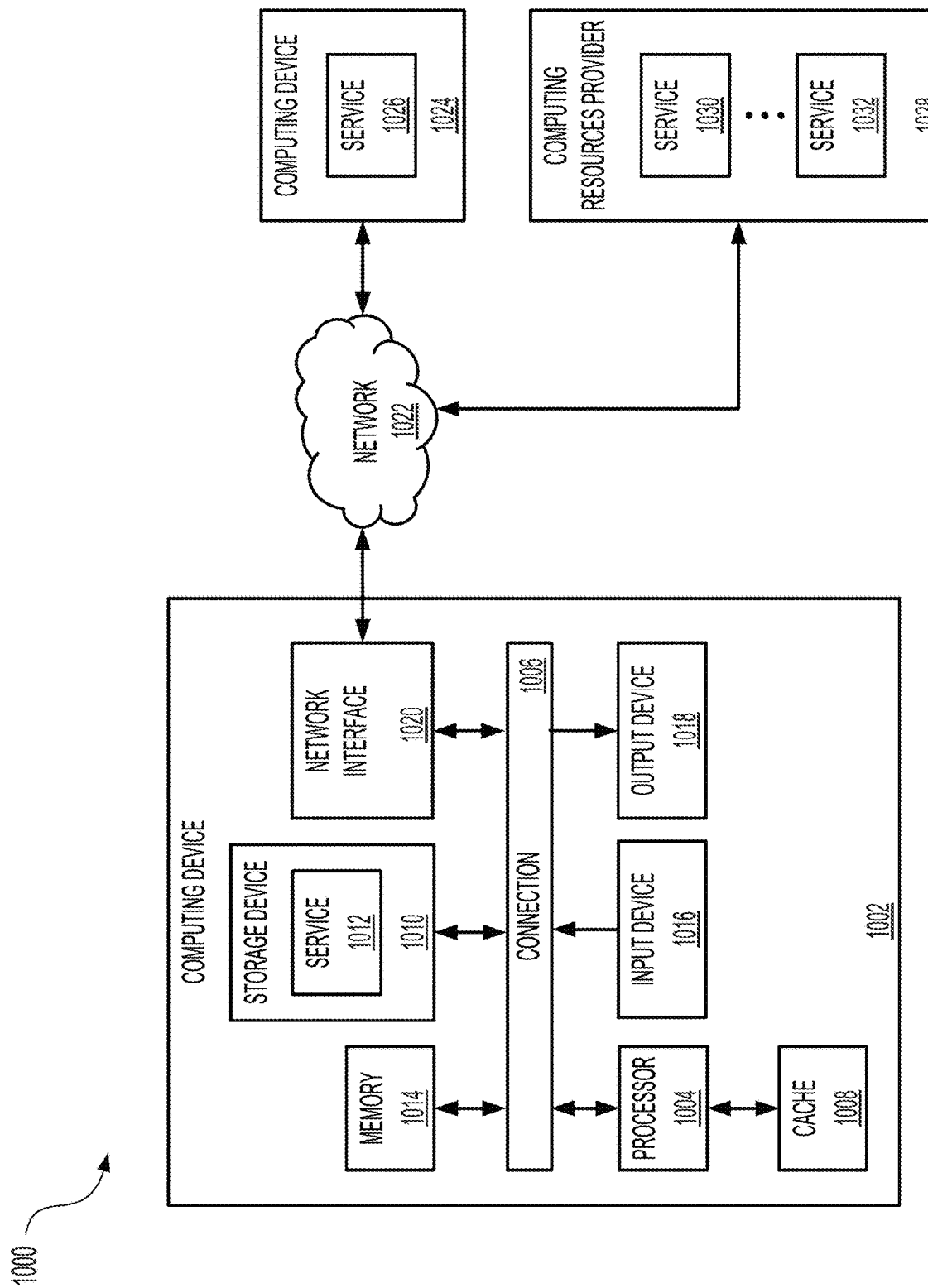
FIG. 10 shows a computing system architecture including various components in electrical communication with each other using a connection in accordance with various embodiments.

FIG. 10 illustrates a computing system architecture 1000, including various components in electrical communication with each other, in accordance with some embodiments. The example computing system architecture 1000 illustrated in FIG. 10 includes a computing device 1002, which has various components in electrical communication with each other using a connection 1006, such as a bus, in accordance with some implementations. The example computing system architecture 1000 includes a processing unit 1004 that is in electrical communication with various system components, using the connection 1006, and including the system memory 1014. In some embodiments, the system memory 1014 includes read-only memory (ROM), random-access memory (RAM), and other such memory technologies including, but not limited to, those described herein. In some embodiments, the example computing system architecture 1000 includes a cache 1008 of high-speed memory connected directly with, in close proximity to, or integrated as part of the processor 1004. The system architecture 1000 can copy data from the memory 1014 and/or the storage device 1010 to the cache 1008 for quick access by the processor 1004. In this way, the cache 1008 can provide a performance boost that decreases or eliminates processor delays in the processor 1004 due to waiting for data. Using modules, methods and services such as those described herein, the processor 1004 can be configured to perform various actions. In some embodiments, the cache 1008 may include multiple types of cache including, for example, level one (L1) and level two (L2) cache. The memory 1014 may be referred to herein as system memory or computer system memory. The memory 1014 may include, at various times, elements of an operating system, one or more applications, data associated with the operating system or the one or more applications, or other such data associated with the computing device 1002.

Other system memory 1014 can be available for use as well. The memory 1014 can include multiple different types of memory with different performance characteristics. The processor 1004 can include any general purpose processor and one or more hardware or software services, such as service 1012 stored in storage device 1010, configured to control the processor 1004 as well as a special-purpose processor where software instructions are incorporated into the actual processor design. The processor 1004 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1004 can be a microprocessor, a microcontroller, a digital signal processor ("DSP"), or a combination of these and/or other types of processors. In some embodiments, the processor 1004 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1000, an input device 1016 can represent any number of input mechanisms, such as a microphone for speech, a touch-sensitive screen for gesture or graphical input, keyboard, mouse, motion input, pen, and other such input devices. An output device 1018 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1000. In some embodiments, the input device 1016 and/or the output device 1018 can be coupled to the computing device 1002 using a remote connection device such as, for example, a communication interface such as the network interface 1020 described herein. In such embodiments, the communication interface can govern and manage the input and output received from the attached input device 1016 and/or output device 1018. As may be contemplated, there is no restriction on operating on any particular hardware arrangement and accordingly the basic features here may easily be substituted for other hardware, software, or firmware arrangements as they are developed.

In some embodiments, the storage device 1010 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1010 can include hardware and/or software services such as service 1012 that can control or configure the processor 1004 to perform one or more functions including, but not limited to, the methods, processes, functions, systems, and services described herein in various embodiments. In some embodiments, the hardware or software services can be implemented as modules. As illustrated in example computing system architecture 1000, the storage device 1010 can be connected to other parts of the computing device 1002 using the system connection 1006. In an embodiment, a hardware service or hardware module such as service 1012, that performs a function can include a software component stored in a non-transitory computer-readable medium that, in connection with the necessary hardware components, such as the processor 1004, connection 1006, cache 1008, storage device 1010, memory 1014, input device 1016, output device 1018, and so forth, can carry out the functions such as those described herein.

The disclosed processed for generating and executing experience recommendations can be performed using a computing system such as the example computing system illustrated in FIG. 10, using one or more components of the example computing system architecture 1000. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for generating and executing experience recommendations described herein by, for example, executing code using a processor such as processor 1004 wherein the code is stored in memory such as memory 1014 as described herein. One or more of a user device, a provider server or system, a database system, or other such devices, services, or systems may include some or all of the components of the computing system such as the example computing system illustrated in FIG. 10, using one or more components of the example computing system architecture 1000 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1028. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1004 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1014 can be coupled to the processor 1004 by, for example, a connector such as connector 1006, or a bus. As used herein, a connector or bus such as connector 1006 is a communications system that transfers data between components within the computing device 1002 and may, in some embodiments, be used to transfer data between computing devices. The connector 1006 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1014 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1014 can also include magnetic or optical data storage media including read-only (e.g., CD ROM and DVD ROM) or otherwise (e.g., CD or DVD). The memory can be local, remote, or distributed.

As described above, the connector 1006 (or bus) can also couple the processor 1004 to the storage device 1010, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1010. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1006 can also couple the processor 1004 to a network interface device such as the network interface 1020. The interface can include one or more of a modem or other such network interfaces including, but not limited to those described herein. It will be appreciated that the network interface 1020 may be considered to be part of the computing device 1002 or may be separate from the computing device 1002. The network interface 1020 can include one or more of an analog modem, Integrated Services Digital Network (ISDN) modem, cable modem, token ring interface, satellite transmission interface, or other interfaces for coupling a computer system to other computer systems. In some embodiments, the network interface 1020 can include one or more input and/or output (I/O) devices. The I/O devices can include, by way of example but not limitation, input devices such as input device 1016 and/or output devices such as output device 1018. For example, the network interface 1020 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1002 can be connected to one or more additional computing devices such as computing device 1024 via a network 1022 using a connection such as the network interface 1020. In such embodiments, the computing device 1024 may execute one or more services 1026 to perform one or more functions under the control of, or on behalf of, programs and/or services operating on computing device 1002. In some embodiments, a computing device such as computing device 1024 may include one or more of the types of components as described in connection with computing device 1002 including, but not limited to, a processor such as processor 1004, a connection such as connection 1006, a cache such as cache 1008, a storage device such as storage device 1010, memory such as memory 1014, an input device such as input device 1016, and an output device such as output device 1018. In such embodiments, the computing device 1024 can carry out the functions such as those described herein in connection with computing device 1002. In some embodiments, the computing device 1002 can be connected to a plurality of computing devices such as computing device 1024, each of which may also be connected to a plurality of computing devices such as computing device 1024. Such an embodiment may be referred to herein as a distributed computing environment.

The network 1022 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1022 can be wired connections, wireless connections, or combinations thereof. Communications via the network 1022 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1022, within the computing device 1002, within the computing device 1024, or within the computing resources provider 1028 can include information, which also may be referred to herein as content. The information may include text, graphics, audio, video, haptics, and/or any other information that can be provided to a user of the computing device such as the computing device 1002. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1002 and presented to a user of the computing device 1002 using forms that are perceptible via sight, sound, smell, taste, touch, or other such mechanisms. In some embodiments, communications over the network 1022 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1002 and/or the computing device 1024 can be connected to a computing resources provider 1028 via the network 1022 using a network interface such as those described herein (e.g. network interface 1020). In such embodiments, one or more systems (e.g., service 1030 and service 1032) hosted within the computing resources provider 1028 (also referred to herein as within "a computing resources provider environment") may execute one or more services to perform one or more functions under the control of, or on behalf of, programs and/or services operating on computing device 1002 and/or computing device 1024. Systems such as service 1030 and service 1032 may include one or more computing devices such as those described herein to execute computer code to perform the one or more functions under the control of, or on behalf of, programs and/or services operating on computing device 1002 and/or computing device 1024.

For example, the computing resources provider 1028 may provide a service, operating on service 1030 to store data for the computing device 1002 when, for example, the amount of data that the computing device 1002 exceeds the capacity of storage device 1010. In another example, the computing resources provider 1028 may provide a service to first instantiate a virtual machine (VM) on service 1032, use that VM to access the data stored on service 1032, perform one or more operations on that data, and provide a result of those one or more operations to the computing device 1002. Such operations (e.g., data storage and VM instantiation) may be referred to herein as operating "in the cloud," "within a cloud computing environment," or "within a hosted virtual machine environment," and the computing resources provider 1028 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1028 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 1030 and service 1032 may implement versions of various services (e.g., the service 1012 or the service 1026) on behalf of, or under the control of, computing device 1002 and/or computing device 1024. Such implemented versions of various services may involve one or more virtualization techniques so that, for example, it may appear to a user of computing device 1002 that the service 1012 is executing on the computing device 1002 when the service is executing on, for example, service 1030. As may also be contemplated, the various services operating within the computing resources provider 1028 environment may be distributed among various systems within the environment as well as partially distributed onto computing device 1024 and/or computing device 1002.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1002) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the processes illustrated in FIGS. 6-8). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1002.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set $\{A, B, C\}$, namely: $\{A\}$, $\{B\}$, $\{C\}$, $\{A, B\}$, $\{A, C\}$, $\{B, C\}$, or $\{A, B, C\}$) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   receiving a request to perform a task on behalf of a member, wherein the task corresponds to a set of operations performable for completion of the task, wherein the set of operations includes a sensitive operation, and wherein the task is assigned to a representative associated with the member for performance of tasks on behalf of the member;
   determining that the sensitive operation is performable using sensitive information associated with the member;
   generating a link associated with a data privacy vault, wherein the link is generated in real-time as other operations in the set of operations associated with the task are being performed, wherein the data privacy vault is inaccessible to the representative, and wherein when the link is received by the member, the member stores the sensitive information in the data privacy vault;
   transferring the task when the other operations are performed, wherein when the task is received by a high-trust representative, the high-trust representative accesses the data privacy vault to obtain the sensitive information for performance of the sensitive operation, and wherein the sensitive information is not made available to the representative;
   communicating status of the task, wherein the status of the task is communicated without the sensitive information;
   evaluating an access log to identify access violations to the sensitive information stored in the data privacy vault; and
   performing one or more remedial actions based on the access violations.

2. The computer-implemented method of claim 1, wherein when the sensitive information is stored in the data privacy vault, the sensitive information is unavailable to the member through the data privacy vault.

3. The computer-implemented method of claim 1, wherein access to the sensitive information within the data privacy vault is subject to a timeout period, and wherein when the timeout period expires, the high-trust representative is automatically prevented from accessing the sensitive information.

4. The computer-implemented method of claim 1, further comprising:
   automatically providing a status corresponding to the performance of the sensitive operation, wherein the status is provided without the sensitive information.

5. The computer-implemented method of claim 1, wherein the task is transferred with an identifier corresponding to the sensitive information, wherein the identifier does not include any portion of the sensitive information, and wherein the identifier is usable to query the data privacy vault to obtain the sensitive information.

6. The computer-implemented method of claim 1, wherein access to the sensitive information is automatically terminated upon the completion of the task.

7. A system, comprising:
one or more processors; and
memory storing thereon instructions that, as a result of being executed by the one or more processors, cause the system to:
receive a request to perform a task on behalf of a member, wherein the task corresponds to a set of operations performable for completion of the task, wherein the set of operations includes a sensitive operation, and wherein the task is assigned to a representative associated with the member for performance of tasks on behalf of the member;
determine that the sensitive operation is performable using sensitive information associated with the member;
generate a link associated with a data privacy vault, wherein the link is generated in real-time as other operations in the set of operations associated with the task are being performed, wherein the data privacy vault is inaccessible to the representative, and wherein when the link is received by the member, the member stores the sensitive information in the data privacy vault;
transfer the task when the other operations are performed, wherein when the task is received by a high-trust representative, the high-trust representative accesses the data privacy vault to obtain the sensitive information for performance of the sensitive operation, and wherein the sensitive information is not made available to the representative;
communicate completion of the task, wherein the completion of the task is communicated without the sensitive information;
evaluate an access log to identify access violations to the sensitive information stored in the data privacy vault; and
perform one or more remedial actions based on the access violations.

8. The system of claim 7, wherein when the sensitive information is stored in the data privacy vault, the sensitive information is unavailable to the member through the data privacy vault.

9. The system of claim 7, wherein access to the sensitive information within the data privacy vault is subject to a timeout period, and wherein when the timeout period expires, the high-trust representative is automatically prevented from accessing the sensitive information.

10. The system of claim 7, wherein the instructions further cause the system to:
automatically provide a status corresponding to the performance of the sensitive operation, wherein the status is provided without sensitive information.

11. The system of claim 7, wherein the task is transferred with an identifier corresponding to the sensitive information, wherein the identifier does not include any portion of the sensitive information, and wherein the identifier is usable to query the data privacy vault to obtain the sensitive information.

12. The system of claim 7, wherein access to the sensitive information is automatically terminated upon the completion of the task.

13. A non-transitory, computer-readable storage medium storing thereon executable instructions that, as a result of being executed by one or more processors of a computer system, cause the computer system to:
receive a request to perform a task on behalf of a member, wherein the task corresponds to a set of operations performable for completion of the task, wherein the set of operations includes a sensitive operation, and wherein the task is assigned to a representative associated with the member for performance of tasks on behalf of the member;
determine that the sensitive operation is performable using sensitive information associated with the member;
generate a link associated with a data privacy vault, wherein the link is generated in real-time as other operations in the set of operations associated with the task are being performed, wherein the data privacy vault is inaccessible to the representative, and wherein when the link is received by the member, the member stores the sensitive information in the data privacy vault;
transfer the task when the other operations are performed, wherein when the task is received by a high-trust representative, the high-trust representative accesses the data privacy vault to obtain the sensitive information for performance of the sensitive operation, and wherein the sensitive information is not made available to the representative;
communicate completion of the task, wherein the completion of the task is communicated without the sensitive information;
evaluate an access log to identify access violations to the sensitive information stored in the data privacy vault; and
perform one or more remedial actions based on the access violations.

14. The non-transitory, computer-readable storage medium of claim 13, wherein when the sensitive information is stored in the data privacy vault, the sensitive information is unavailable to the member through the data privacy vault.

15. The non-transitory, computer-readable storage medium of claim 13, wherein access to the sensitive information within the data privacy vault is subject to a timeout period, and wherein when the timeout period expires, the high-trust representative is automatically prevented from accessing the sensitive information.

16. The non-transitory, computer-readable storage medium of claim 13, wherein the executable instructions further cause the computer system to:
automatically provide a status corresponding to the performance of the sensitive operation, wherein the status is provided without sensitive information.

17. The non-transitory, computer-readable storage medium of claim 13, wherein the task is transferred with an identifier corresponding to the sensitive information, wherein the identifier does not include any portion of the sensitive information, and wherein the identifier is usable to query the data privacy vault to obtain the sensitive information.

18. The non-transitory, computer-readable storage medium of claim 13, wherein access to the sensitive information is automatically terminated upon the completion of the task.

19. The computer-implemented method of claim 1, wherein the one or more remedial actions include suspending the high-trust representative to prohibit the high-trust representative from accessing the data privacy vault to access the sensitive information.

20. The system of claim 7, wherein the one or more remedial actions include suspending the high-trust representative to prohibit the high-trust representative from accessing the data privacy vault to access the sensitive information.

21. The non-transitory, computer-readable storage medium of claim 13, wherein the one or more remedial actions include suspending the high-trust representative to prohibit the high-trust representative from accessing the data privacy vault to access the sensitive information.

\* \* \* \* \*